(12) United States Patent
Kim et al.

(10) Patent No.: US 11,675,469 B2
(45) Date of Patent: Jun. 13, 2023

(54) INPUT SENSING PANEL AND AN ELECTRONIC APPARATUS HAVING THE SAME

(71) Applicant: Samsung Display Co., Ltd., Yongin-Si (KR)

(72) Inventors: Il-Joo Kim, Hwaseong-si (KR); Wonkyu Kwak, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/746,099

(22) Filed: May 17, 2022

(65) Prior Publication Data

US 2022/0276746 A1 Sep. 1, 2022

Related U.S. Application Data

(63) Continuation of application No. 17/242,775, filed on Apr. 28, 2021, now Pat. No. 11,334,207.

(30) Foreign Application Priority Data

Jul. 30, 2020 (KR) ........................ 10-2020-0095477

(51) Int. Cl.
*G06F 3/044* (2006.01)
(52) U.S. Cl.
CPC .. *G06F 3/0446* (2019.05); *G06F 2203/04111* (2013.01); *G06F 2203/04112* (2013.01)
(58) Field of Classification Search
CPC ......... G06F 3/0446; G06F 2203/04111; G06F 2203/04112
See application file for complete search history.

(56) References Cited

U.S. PATENT DOCUMENTS

| 9,491,852 | B2 | 11/2016 | Lyon et al. |
| 10,312,297 | B2 | 6/2019 | Lee et al. |
| 2016/0139727 | A1 | 5/2016 | Kim et al. |

(Continued)

FOREIGN PATENT DOCUMENTS

| KR | 10-2016-0057572 | 5/2016 |
| KR | 10-1723879 | 4/2017 |
| KR | 10-2018-0036896 | 4/2018 |

*Primary Examiner* — Deeprose Subedi
(74) *Attorney, Agent, or Firm* — F. Chau & Associates, LLC

(57) ABSTRACT

An input sensing panel including: first sensing electrodes extending in a first direction, arranged in a second direction, and including first sensing patterns and first bridge patterns disposed between the first sensing patterns; second sensing electrodes extending in the second direction and including second sensing patterns and second bridge patterns disposed between the second sensing patterns; a first trace line connected to the first sensing patterns; and a second trace line connected to the second sensing patterns, the second trace line including: side lines each including a diagonal portion extending in a diagonal direction with respect to the first or second directions and an extension portion extending in the first direction from the diagonal portion; and center lines extending in the first direction, wherein the diagonal portion overlaps first sensing patterns of different first sensing electrodes and the extension portion overlaps first sensing patterns of the same first sensing electrode.

15 Claims, 23 Drawing Sheets

(56) References Cited

U.S. PATENT DOCUMENTS

| | | |
|---|---|---|
| 2019/0369787 A1 | 12/2019 | Park et al. |
| 2020/0245468 A1* | 7/2020 | Noma .................... H05K 3/103 |
| 2022/0011896 A1* | 1/2022 | Yun .................... G06F 3/04164 |
| 2022/0035486 A1 | 2/2022 | Kim et al. |

* cited by examiner

INPUT SENSING PANEL AND AN ELECTRONIC APPARATUS HAVING THE SAME

CROSS-REFERENCE TO RELATED APPLICATIONS

This U.S. non-provisional patent application is a continuation of U.S. patent application Ser. No. 17/242,773 filed on Apr. 28, 2021, which claims priority under 35 U.S.C. § 119 to Korean Patent Application No. 10-2020-0095477, filed on Jul. 30, 2020, the disclosures of which are incorporated by reference herein in their entireties.

1. TECHNICAL FIELD

The present disclosure relates to an electronic apparatus including an input sensing panel. More particularly, the present disclosure relates to an electronic apparatus having increased reliability.

2. DESCRIPTION OF THE RELATED ART

An electronic apparatus may include a display panel that displays an image and an input sensing panel that senses an external input. For example, an electronic apparatus such as a smartphone may include an input sensing panel disposed on the display panel. The input sensing panel may be integrally formed with the display panel through successive processes. In another technique, the input sensing panel is coupled to the display panel after the input sensing panel is manufactured through a separate process from that of the display panel.

SUMMARY

Embodiments of the inventive concept provide an input sensing panel including: first sensing electrodes emending in a first direction, arranged in a second direction crossing the first direction, and including first sensing patterns arranged in the first direction and first bridge patterns disposed between the first sensing patterns; second sensing electrodes insulated from the first sensing electrodes, extending in the second direction, arranged in the first direction, and including second sensing patterns arranged in the second direction and second bridge patterns disposed between the second sensing patterns; a first trace line connected to the first sensing patterns; and a second trace line connected to the second sensing patterns, the second trace line including: side lines each including a diagonal portion extending in a diagonal direction with respect to the first or second directions and an extension portion extending in the first direction from the diagonal portion; and center lines extending in the first direction, wherein the diagonal portion overlaps the first sensing patterns of different first sensing electrodes and the extension portion overlaps the first sensing patterns of the same first sensing electrode.

The side lines may include first lines and second lines spaced apart from the first lines with the center lines interposed therebetween.

The second sensing patterns connected to the diagonal portion of each of the first lines may be alternately arranged with the second sensing patterns connected to the diagonal portion of each of the second lines in the first direction.

The second sensing patterns connected to the diagonal portion of each of the first lines and the second sensing patterns connected to the diagonal portion of each of the second lines may be arranged in a zigzag shape in the first direction.

The second sensing patterns connected to the diagonal portion of each of the first lines and the second sensing patterns connected to the diagonal portion of each of the second lines may be arranged in the first direction.

The side lines may be disposed only at one of left and right sides with respect to the center lines.

Each of the diagonal portion and the extension portion of at least one of the side lines may be provided in plural.

The input sensing panel may further include: a first sensing insulating layer; a first conductive layer disposed on the first sensing insulating layer; a second sensing insulating layer disposed on the first conductive layer; a second conductive layer disposed on the second sensing insulating layer; and a third sensing insulating layer disposed on the second conductive layer, wherein the side lines are connected to corresponding second sensing patterns through a first contact hole in the second sensing insulating layer.

The first conductive layer may include a floating pattern connected to at least one of the first sensing patterns and the second sensing patterns through a second contact hole in the second sensing insulating layer.

The first bridge patterns may be included in the first conductive layer, the first sensing patterns, the second sensing patterns, and the second bridge patterns may be included in the second conductive layer, and the first bridge patterns may be connected to the first sensing patterns through a third contact hole in the second sensing insulating layer.

The second bridge patterns may be included in the first conductive layer, the first sensing patterns, the first bridge patterns, and the second sensing patterns may be included in the second conductive layer, and the second bridge patterns may be connected to the second sensing patterns through a fourth contact hole in the second sensing insulating layer.

At least one of the first sensing patterns may include: a center pattern extending in the first direction; and branch patterns connected to the center pattern and extending in directions different from the first and second directions, and at least two of the second sensing patterns surrounds the center pattern and the branch patterns.

The first and second conductive layers may extend in diagonal directions with respect to the first and second directions and comprise a plurality of mesh lines through which a mesh opening is provided.

Embodiments of the inventive concept provide an electronic apparatus including: a display panel including an active area and a peripheral area surrounding at least a portion of the active area, the display panel further including a plurality of pixels; and an input sensing panel disposed on the display panel and including a plurality of first sensing electrodes extending in a first direction and arranged in a second direction crossing the first direction, a plurality of second sensing electrodes insulated from the first sensing electrodes, extending in the second direction, and arranged in the first direction, a first trace line connected to the first sensing electrodes, and a second trace line connected to the second sensing electrodes, the second trace line including: side lines each including a slanted portion extending in a third direction slanted with respect to the first and second directions and an extension portion extending in the first direction from the slanted portion; and center lines extending in the first direction, wherein the slanted portion overlaps the active area.

Each of the first sensing electrodes may include: first sensing patterns arranged in the first direction; and first bridge patterns disposed between the first sensing patterns, each of the second sensing electrodes may include: second sensing patterns arranged in the second direction; and second bridge patterns disposed between the second sensing patterns, the extension portion of one of the side lines overlaps the first sensing patterns in the same first sensing electrode, and the slanted portion of the one side line overlaps the first sensing patterns in different first sensing electrodes.

The side lines may include first lines and second lines spaced apart from the first lines with the center lines interposed therebetween.

The second sensing patterns connected to the slanted portion of each of the first lines may be alternately arranged with the second sensing patterns connected to the slanted portion of each of the second lines in the first direction.

The second sensing patterns connected to the slanted portion of each of the first lines and the second sensing patterns connected to the slanted portion of each of the second lines may be arranged in a zigzag shape in the first direction.

The second sensing patterns connected to the slanted portion of each of the first lines and the second sensing patterns connected to the slanted portion of each of the second lines may be aligned in the first direction.

The electronic apparatus may further include: a first sensing insulating layer; a first conductive layer disposed on the first sensing insulating layer; a second sensing insulating layer disposed on the first conductive layer; a second conductive layer disposed on the second sensing insulating layer; and a third sensing insulating layer disposed on the second conductive layer, wherein the side lines are connected to corresponding second sensing patterns through a first contact hole in the second sensing insulating layer.

The first conductive layer may include a floating pattern connected to at least one of the first sensing patterns and the second sensing patterns through a second contact hole in the second sensing insulating layer.

The first bridge patterns may be included in the first conductive layer, the first sensing patterns, the second sensing patterns, and the second bridge patterns play be included in the second conductive layer, and the first bridge patterns may be connected to the first sensing patterns through a third contact hole in the second sensing insulating layer.

The side lines may be disposed only at one of left and right sides with respect to the center lines.

Each of the slanted portion and the extension portion of at least one of the side lines may be provided in plural.

The first and second conductive layers may extend in slanted directions with respect to the first and second directions and include a plurality of mesh lines through which a mesh opening is provided.

The display panel may include: a base substrate; a circuit element layer disposed on the base substrate and including a transistor; a display element layer including a pixel definition layer disposed on the circuit element layer and provided with a display opening, a first electrode including at least a portion exposed through the display opening and connected to the transistor, a second electrode disposed on the first electrode, and a light emitting layer disposed between the first electrode and the second electrode; and a thin film encapsulation layer covering the display element layer, and at least a portion of the mesh opening overlaps the display opening.

The input sensing panel may be disposed directly on the thin film encapsulation layer.

The electronic apparatus may further include an electronic module overlapping the active area and disposed under the display panel.

The display panel and the input sensing panel may be provided with a module hole in the display panel and the input sensing panel, and the module hole overlaps the electronic module.

The electronic module may include a camera module, a light receiving module, or a light emitting module.

Embodiments of the inventive concept provide an input sensing panel including: a first trace line having a first end connected to a sensing pad and a second end connected to a first one of a plurality of second sensing electrodes, the first trace line having a first portion extending in a first direction and overlapping a first sensing electrode and a second portion extending in a slanted direction with respect to the first direction to connect to the first one of the plurality of second sensing electrodes; and a second trace line having a first end connected to the sensing pad and a second end connected to a second one of the plurality of second sensing electrodes, the second trace line having a first portion extending in the first direction and overlapping the same first sensing electrode overlapped by the first portion of the first trace line and a second portion extended in the slanted direction and connected to the second one of the plurality of second sensing electrodes.

The first trace line may be disposed closer to an edge of an active area than the second trace line.

The first one of the plurality of second sensing electrodes and the second one of the plurality of second sensing electrodes may be located at the center of the input sensing panel.

The second portion of the first trace line may overlap a plurality of first sensing electrodes different from the first sensing electrode overlapped by the first portion of the first trace line.

The first one of the plurality of second sensing electrodes and the second one of the plurality of second sensing electrodes may be located at opposite side of the center of the input sensing panel.

BRIEF DESCRIPTION OF THE DRAWINGS

The above and other features of the present disclosure will become readily apparent by reference to the following detailed description when considered in conjunction with the accompanying drawings wherein:

FIG. 5B is a cross-sectional view taken alone a line I-I' shown in FIG. 5A;

DETAILED DESCRIPTION OF THE EMBODIMENTS

Figure 1:
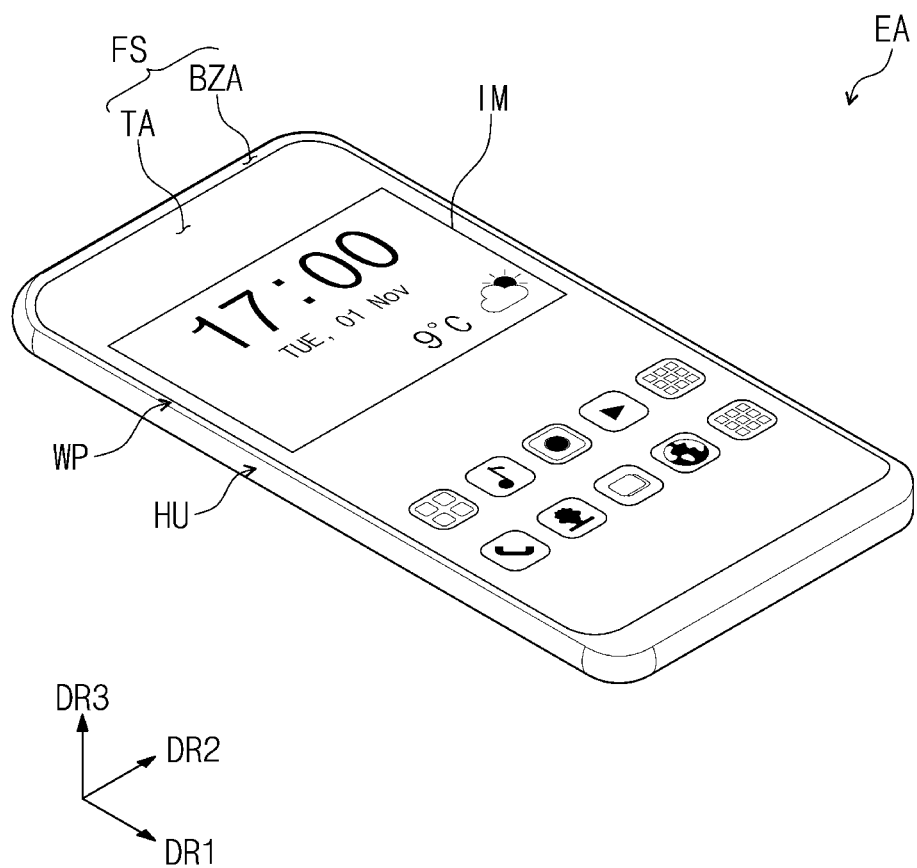
FIG. 1 is a perspective view showing an electronic apparatus according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout. In the drawings, the thickness, ratio, and dimension of components may be exaggerated.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein to describe one element or feature's relationship to another element(s) or feature(s) as illustrated in the figures.

Hereinafter, the present disclosure will be explained in detail with reference to the accompanying drawings.

Figure 2A:
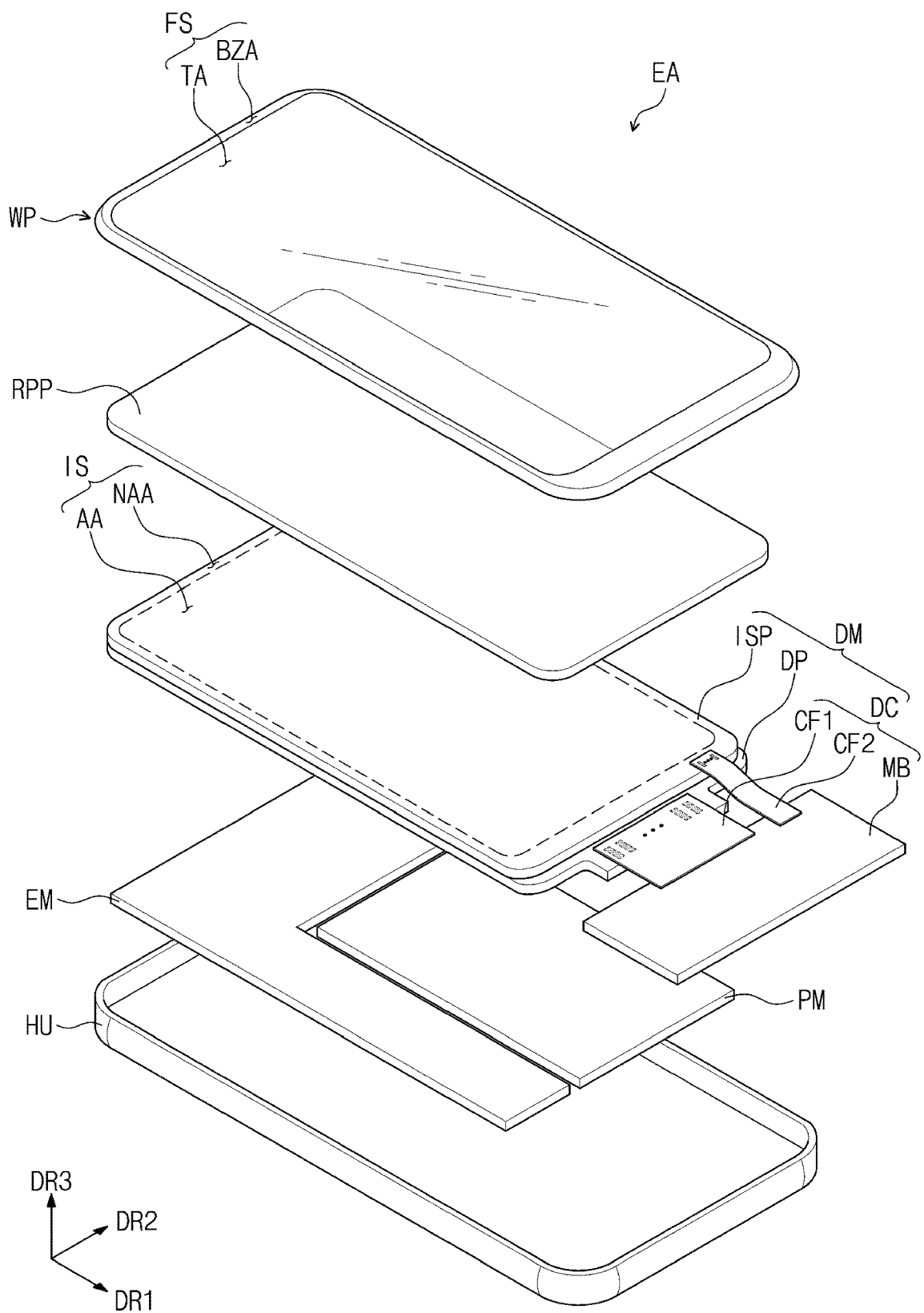
FIG. 2A is an exploded perspective view showing an electronic apparatus according to an embodiment of the present disclosure.
Figure 2B:
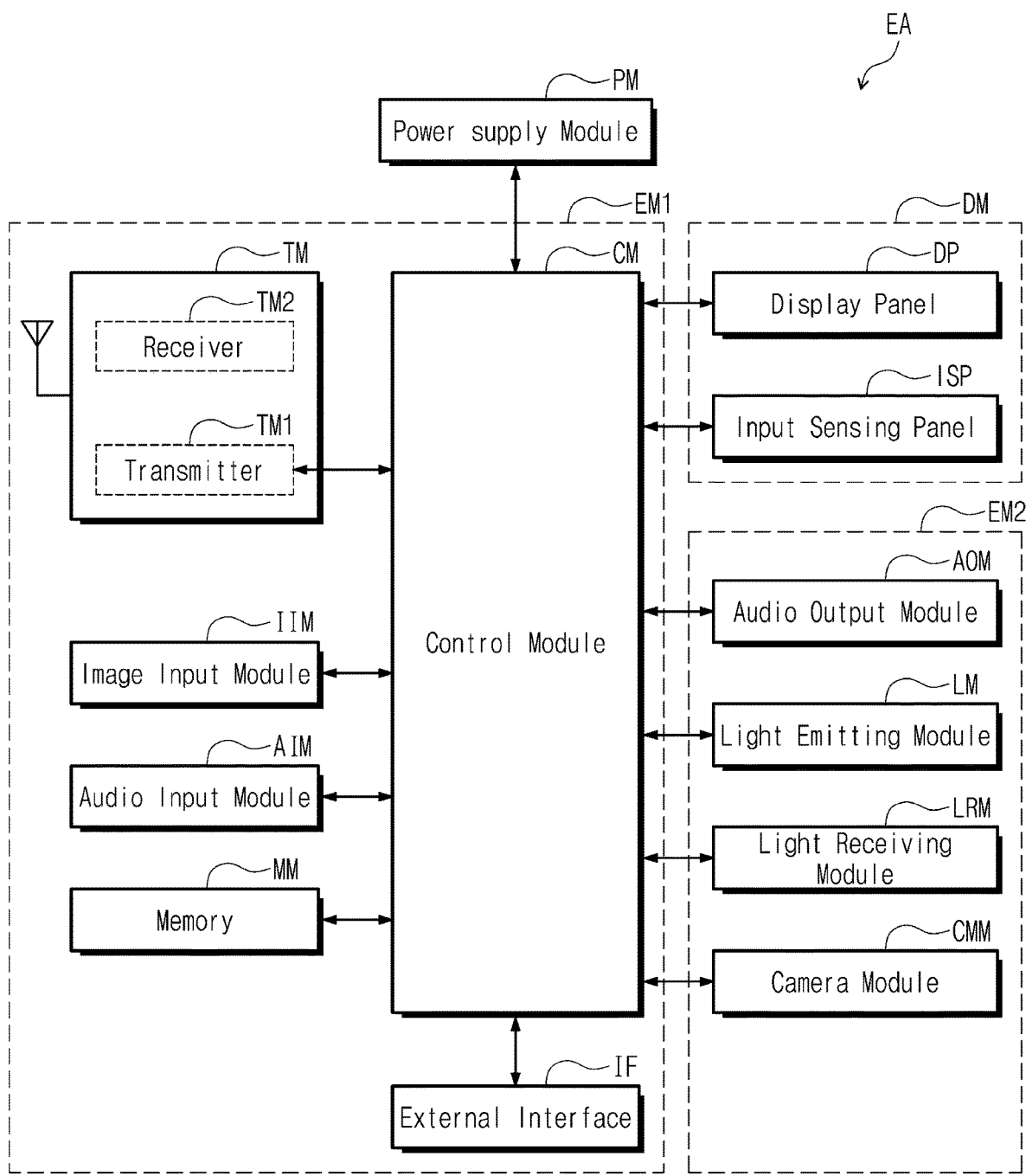
FIG. 2B is a block diagram showing an electronic apparatus according to an embodiment of the present disclosure.
Figure 3A:
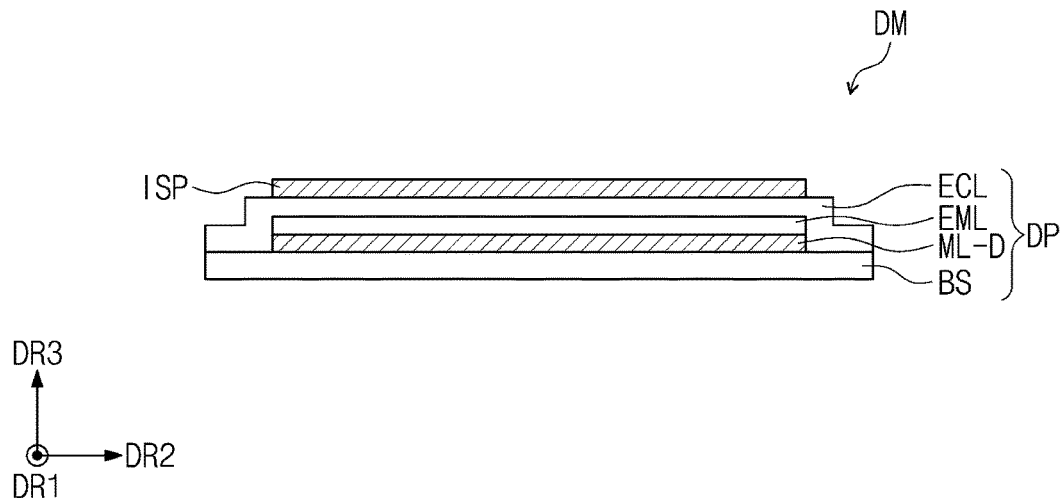
FIG. 3A is a cross-sectional view showing a display module according to an embodiment of the present disclosure.
Figure 3B:
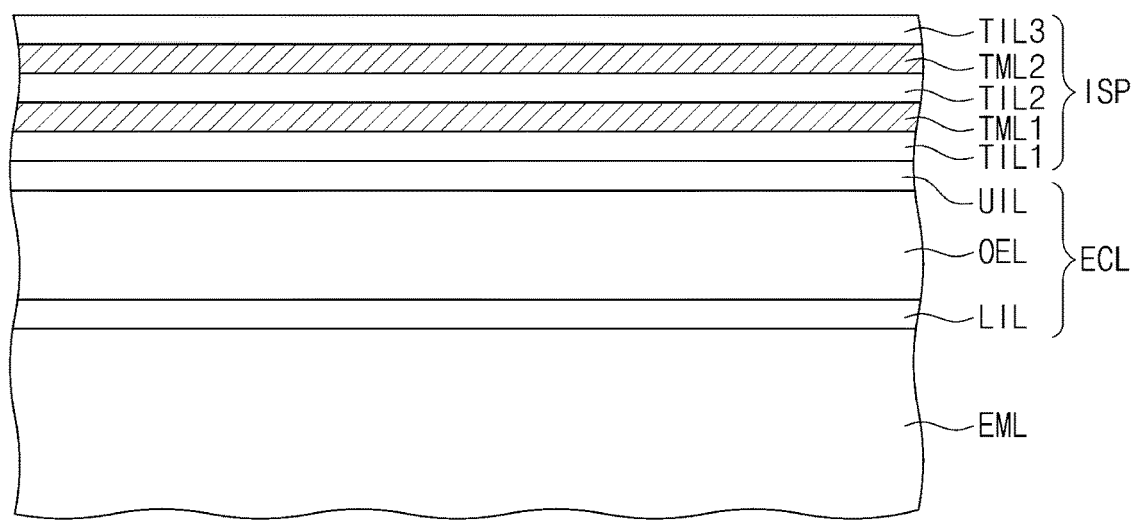
FIG. 3B is an enlarged cross-sectional view showing a display module of FIG. 3A.
Figure 4:
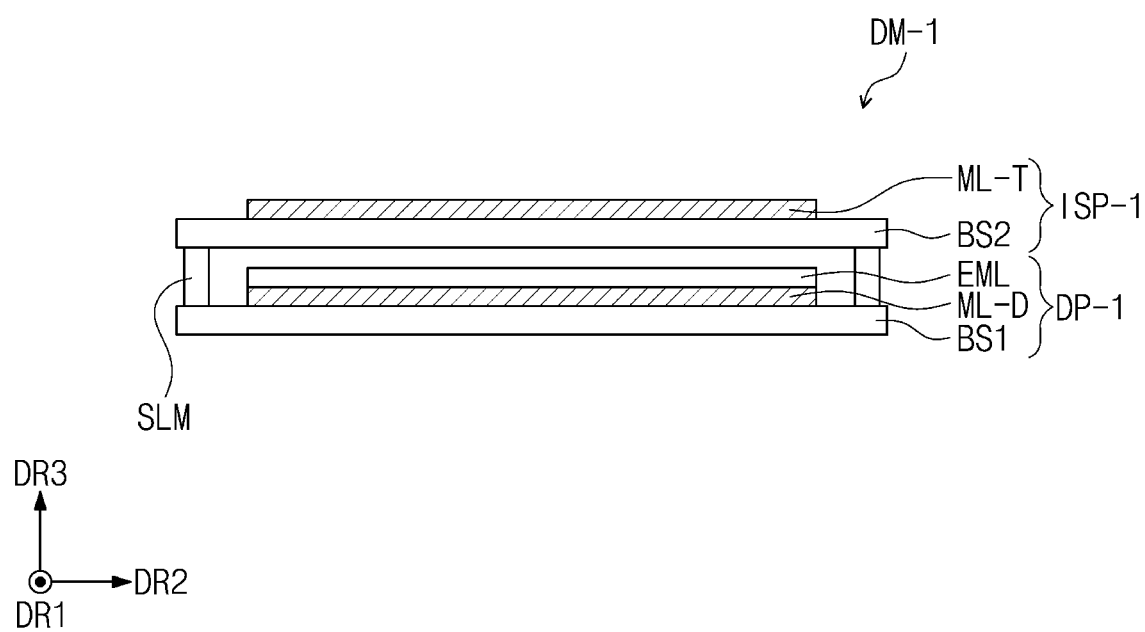
FIG. 4 is a cross-sectional view showing a display module according to an embodiment of the present disclosure.

FIG. 1 is a perspective view showing an electronic apparatus EA according to an embodiment of the present disclosure. FIG. 2A is an exploded perspective view showing the electronic apparatus EA according to an embodiment of the present disclosure. FIG. 2B is a block diagram showing the electronic apparatus EA according to an embodiment of the present disclosure. FIG. 3A is a cross-sectional view showing a display module DM according to an embodiment of the present disclosure. FIG. 3B is an enlarged cross-sectional view showing the display module DM of FIG. 3A. FIG. 4 is a cross-sectional view showing a display module DM-1 according to an embodiment of the present disclosure.

Referring to FIGS. 1 and 2A, the electronic apparatus EA may be an apparatus activated in response to an electrical signal. The electronic apparatus EA may include various electronics. For example, the electronic apparatus EA may be applied to a large-sized electronic item, such as a television set, a monitor, or an outdoor billboard, and a small and medium-sized electronic item, such as a personal computer, a notebook computer, a personal digital assistant, a navigation unit, a game unit, a mobile electronic device, and a camera. These are merely examples, and thus, the electronic apparatus EA may be applied to other electronics. In the present embodiment, a smartphone will be described as a representative example of the electronic apparatus EA.

The electronic apparatus EA displays an image IM through a display surface FS, which is substantially parallel to each of a first direction DR1 and a second direction DR2. The image IM includes a motion image and a still image. FIG. 1 shows a clock widget and application icons as a representative example of the image IM. The display surface FS, through which the image IM is displayed, corresponds to a front surface of the electronic apparatus EA and a front surface of a window panel WP.

In the present embodiment, front (or upper) and rear (or lower) surfaces of each member of the electronic apparatus EA may be defined with respect to a direction in which the image IM is displayed. The front and rear surfaces face each other in a third direction DR3, and a normal line direction of each of the front and rear surfaces is substantially parallel to the third direction DR3. Directions indicated by the first, second, and third directions DR1, DR2, and DR3 are relative to each other, and thus, the directions indicated by the first, second, and third directions DR1, DR2, and DR3 may be changed to other directions. In the following descriptions, the expression "when viewed in a plane" may mean a state of being viewed in the third direction DR3.

The electronic apparatus EA includes the window panel WP, an anti-reflective panel RPP, a display module DM, an electronic module EM, a power supply module PM, and a housing HU. In the present embodiment, the window panel WP and the housing HU are coupled to each other to form an exterior of the electronic apparatus EA.

The window panel WP includes an optically transparent insulating material. For example, the window panel WP includes a glass or plastic material. The window panel WP has a single-layer or multi-layer structure. As an example, the window panel WP includes a plurality of plastic films attached to each other by an adhesive or a glass substrate and a plastic film attached to the glass substrate by an adhesive.

The front surface FS of the window panel WP forms the front surface of the electronic apparatus EA as described above. A transmissive area TA may be an optically transparent area. For example, the transmissive area TA may be an area having a visible light transmittance of about 90% or more.

A bezel area BZA may be an area having a relatively lower transmittance as compared with the transmissive area TA. The bezel area BZA conforms to a shape of the transmissive area TA. The bezel area BZA is disposed adjacent to the transmissive area TA and surrounds the transmissive area TA.

The bezel area BZA has a predetermined color. The bezel area BZA covers a peripheral area NAA of the display module DM to prevent the peripheral area NAA from being viewed from the outside. However, this is merely an example, and the bezel area BZA may be omitted from the window panel WP.

The anti-reflective panel RPP is disposed under the window panel WP. The anti-reflective panel RPP reduces a reflectance of an external light incident thereto, wherein the external light is provided from the above the window panel WP. In the present embodiment, the anti-reflective panel RPP may be omitted or may be included in the display module DM.

The display module DM displays the image IM and senses an external input. The display module DM includes a front surface IS in which an active area AA and the peripheral area NAA are provided. The active area AA may be an area activated in response to an electrical signal.

In the present embodiment, the active area AA is an area through which the image IM is displayed and the external input is sensed. The transmissive area TA overlaps an entire surface or at least a portion of the active area AA.

Accordingly, a user perceives the image IM or provides the external input through the transmissive area TA, however, this is merely an example. In other words, an area through which the image IM is displayed and an area through which the external input is sensed may be separated from each other in the active area AA of the display module DM, but they should not be limited thereto.

The peripheral area NAA may be covered by the bezel area BZA. The peripheral area NAA may be adjacent to the active area AA. The peripheral area NAA may surround the active area AA. A driving circuit or a driving wiring line may be disposed in the peripheral area NAA to drive components within the active area AA.

The display module DM includes a display panel DP, an input sensing panel ISP and a driving circuit DC.

The display panel DP includes configurations to generate the image IM. The image IM generated by the display panel DP is perceived outside by the user through the transmissive area TA.

The input sensing panel ISP senses the external input applied from the outside. As described above, the input sensing panel ISP senses the external input applied to the window panel WP.

The external inputs may be provided in a variety of ways. For example, the external inputs may include a proximity input (e.g., hovering) applied when an object gets close to or adjacent to the electronic apparatus EA as well as a touch input by a user's body (e.g., user's hand). The proximity input may be received when an object such as a touch pen or the user's hand gets within a predetermined distance to the display surface FS. In addition, the external inputs may be provided in the forth of force, pressure, light, etc., however, the external inputs are not limited thereto.

The driving circuit DC is electrically connected to the display panel DP and the input sensing panel ISP. The driving circuit DC includes a main circuit board MB, a first circuit board CF1, and a second circuit board CF2.

The first circuit board CF1 is electrically connected to the display panel DP. The first circuit board CF1 connects the display panel DP and the main circuit board MB. In the present embodiment, the first circuit board CF1 may be a flexible circuit film.

The first circuit board CF1 is connected to pads (display pads) of the display panel DP, which are disposed in the peripheral area NAA. For example, the first circuit board CF1 may be connected to pads provided on a protruded portion of the display panel DP. The first circuit board CF1 provides electrical signals to the display panel DP to drive the display panel DP. The electrical signals are generated by the first circuit board CF1 or the main circuit board MB.

The second circuit board CF2 is electrically connected to the input sensing panel ISP. The second circuit board CF2 connects the input sensing panel ISP and the main circuit board MB. In the present embodiment, the second circuit board CF2 may be a flexible circuit film.

The second circuit board CF2 is connected to pads (sensing pads) of the input sensing panel ISP, which are disposed in the peripheral area NAA. For example, the second circuit board CF2 may be connected to pads provided on an upper surface of the input sensing panel ISP. In this case, the connections of the first circuit board CF1 and the second circuit board CF2 may be at different heights in the third direction DR3. The second circuit board CF2 provides electrical signals to the input sensing panel ISP to drive the input sensing panel ISP. The electrical signals are generated by the second circuit board CF2 or the main circuit board MB.

The second circuit board CF2 is disposed at a right lower end of the input sensing panel ISP, however, the location of the second circuit board CF2 is not limited thereto. For example, the second circuit board CF2 may be disposed at a left lower end of the input sensing panel ISP. The second circuit board CF2 may be provided in plural. The second circuit boards CF2 may be spaced apart from each other and may be disposed at left and right lower ends of the input sensing panel ISP or may cover the first circuit board CF1. In addition, the second circuit board CF2 may integrally provided with the first circuit board CF1, and the position, number, and shape of the second circuit boards CF2 should not be limited.

The main circuit board MB includes various driving circuits to drive the display module DM and a connector to provide power. The first and second circuit boards CF1 and CF2 are connected to the main circuit board MB.

According to the present disclosure, the display module DM is controlled by using one main circuit board MB, however this is merely an example. In the display module DM according to an embodiment of the present disclosure, the display panel DP and the input sensing panel ISP may be connected to different main circuit boards, and one of the first and second circuit boards CF1 and CF2 may not be connected to the main circuit board MB. However, they should not be limited to a particular embodiment.

Referring to FIG. 2B, the electronic apparatus EA may include the display module DM, the power supply module PM, the electronic module EM. The electronic module EM may include a first electronic module EM1 and a second electronic module EM2. The display module DM, the power supply module PM, the first electronic module EM1, and the second electronic module EM2 may be electrically connected to each other.

The first electronic module EM1 and the second electronic module EM2 may include various functional modules to operate the electronic apparatus EA. The first electronic module EM1 may be mounted directly on a mother board that is electrically connected to the display module DM or may be electrically connected to the mother board via a connector after being mounted on a separate substrate.

The first electronic module EM1 may include a control module CM, a wireless communication module TM, an image input module IIM, an audio input module AIM, a memory MM, and an external interface IF. Some modules among the modules included in the first electronic module EM1 may be electrically connected to the mother board through a flexible circuit board without being mounted on the mother board.

The control module CM may control an overall operation of the electronic apparatus EA. The control module CM may be, but not limited to, a microprocessor. For example, the control module CM may activate or deactivate the display module DM. The control module CM may control other modules, such as the image input module IIM, the audio input module AIM, or the like, based on the touch signal provided from the display module DM.

The wireless communication module TM may transmit/receive a wireless signal to/from other terminals using a Bluetooth or WiFi link. The wireless communication module TM may transmit/receive a voice signal using a general communication line. The wireless communication module TM may include a transmitter TM1 that modulates a signal to be transmitted and transmits the modulated signal and a receiver TM2 that demodulates the signal applied thereto.

The image input module IIM may process an image signal and may convert the image signal into image data that may be displayed through the display module DM. The audio input module AIM may receive an external sound signal through a microphone in a record mode or a voice recognition mode and may convert the external sound signal to electrical voice data.

The external interface IF serves as an interface between the control module CM and external devices, such as an external charger, a wired/wireless data port, a card socket (e.g., a memory card and a subscriber identification module (SIM)/user identity module (UIM) card), etc.

The second electronic module EM2 may include an audio output module AOM, a light emitting module LM, a light receiving module LRM, and a camera module CMM. Some modules included in the second electrode module EM2 or the entire second electronic module EM2 itself may be mounted directly on the mother board, may be electrically connected to the display module DM via a connector after being mounted on a separate substrate, or may be electrically connected to the first electronic module EM1.

The audio output module AOM may convert the sound data provided from the wireless communication module TM or the sound data stored in the memory MM and may output the converted sound data to the outside.

The light emitting module LM may generate a light and may output the light. The light emitting module LM may emit an infrared ray. The light emitting module LM may include a light emitting diode (LED) element. The light receiving module LRM may sense the infrared ray. The light receiving module LAM may be activated when the infrared ray having a predetermined level or higher is sensed. The light receiving module LRM may include a complementary metal oxide semiconductor (CMOS) sensor. The infrared ray generated by and output from the light emitting module LM may be reflected by an external object, e.g., a user's finger or face, and the reflected infrared ray may be incident into the light receiving module LRM. The camera module CMM may take an image of an external object.

The power supply module PM may supply a power source required for the overall operation of the electronic apparatus EA. The power supply module PM may include a battery module.

Referring to FIGS. 3A and 3B, the display module DM may include the display panel DP and the input sensing panel ISP.

The display panel DP may include a base substrate BS, a circuit element layer ML-D, a display element layer EML, and a thin film encapsulation layer ECL. The input sensing panel ISP may include a plurality of sensing insulating layers TIL1, TIL2, and TIL3 and a plurality of conductive layers TML1 and TML2.

The base substrate BS may be a base layer on which the circuit element layer ML-D, the display element layer EML, the thin film encapsulation layer ECL, and the input sensing panel ISP are stacked. The base substrate BS may be flexible or rigid and may have a single-layer or multi-layer structure, however, it should not be limited thereto or thereby.

The circuit element layer ML-D may be disposed on the base substrate BS. The circuit element layer ML-D may include a plurality of insulating layers, a plurality of conductive layers, and a semiconductor layer. The conductive layers of the circuit element layer ML-D may form signal lines or a control circuit of a pixel.

The display element layer EML may be disposed on the circuit element layer ML-D. The display element layer EML may include organic light emitting diodes, however, this is merely an example. The display element layer EML according to an embodiment of the present disclosure mays include inorganic light emitting diodes, organic-inorganic light emitting diodes, or a liquid crystal layer.

The thin film encapsulation layer ECL may include an organic layer OEL and a plurality of inorganic layers LIL and UIL to encapsulate the organic layer OEL. In other words, the organic layer OEL may be disposed between the inorganic layers LIL and UIL. The thin film encapsulation layer ECL may encapsulate the display element layer EML to block moisture and oxygen from entering the display element layer EML. For example, the thin film encapsulation layer ECL may cover opposite sides of the display element layer EML.

The inorganic layers LIL and UIL and may prevent the external moisture or oxygen from entering the display element layer EML. The inorganic layers LIL and UIL may include silicon nitride, silicon oxide, or a compound thereof. The inorganic layers may be formed through a deposition process.

The organic layer OEL may be disposed on the display element layer EML to provide a flat surface. Uneven portions or particles on the display element layer EML may be covered by the organic layer OEL, and thus, the organic layer OEL may prevent the uneven portions or particles from exerting influences on the components formed on the organic layer OEL. In other words, the organic layer OEL may prevent, e.g., external inputs to the input sensing panel ISP, from impacting the display element layer EML.

The input sensing panel ISP may be disposed on the thin film encapsulation layer ECL. The input sensing panel ISP may be disposed directly on the thin film encapsulation layer ECL and may be formed together with the thin film encapsulation layer ECL through successive processes. The input sensing panel ISP may sense the external input using one of a self-capacitance method and a mutual capacitance method. Sensing patterns included in the input sensing panel ISP may be arranged and connected in various ways in accordance with the sensing method employed.

The input sensing panel ISP may include the sensing insulating layers TIL1, TIL2, and TIL3 and at least one conductive layer TML1 and TML2. The sensing insulating layers TIL1, TIL2, and TIL3 may include one of an inorganic material and an organic material.

A first sensing insulating layer TIL1 may be disposed directly on a second inorganic layer UIL of the thin film encapsulation layer ECL. A first conductive layer TML1 may be disposed on the first sensing insulating layer TIL1. A second sensing insulating layer TIL2 may be disposed on the first sensing insulating layer TIL1 and may cover the first conductive layer TML1. A second conductive layer TML2 may be disposed on the second sensing insulating layer TIL2. A third sensing insulating layer TIL3 may be disposed on the second sensing insulating layer TIL2 and may cover the second conductive layer TML2. However, the configuration of these layers should not be limited thereto or thereby. For example, the first sensing insulating layer TIL1 may be omitted, and the first conductive layer TML1 may be disposed directly on the second inorganic layer UIL.

The conductive layers TML1 and TML2 may include one of a metal or transparent conductive material having a single-layer structure. For example, the metal material may include molybdenum, silver, titanium, copper, aluminum, and alloys thereof.

The transparent conductive material may include a transparent conductive oxide, such as indium tin oxide (ITO), indium zinc oxide (IZO), zinc oxide (ZnO), indium tin zinc oxide (ITZO), or the like. In addition, the transparent conductive material may include conductive polymer such as PEDOT, metal nanowire, graphene, or the like.

The conductive layers TML1 and TML2 may include metal layers having the multi-layer structure. The metal layers may have a three-layer structure of titanium/aluminum/titanium. The conductive layers TML1 and TML2 having the multi-layer structure may include at least one metal layer and at least one transparent conductive layer.

Referring to FIG. 4, the display module DM-1 may include a display panel DP-1, an input sensing panel ISP-1, and a coupling member SLM.

The display panel DP-1 may include a first base substrate BS1, a circuit element layer ML-D, and a display element layer EML. The input sensing panel ISP-1 may include a second base substrate BS2 and a sensing circuit layer ML-T. Each of a first base substrate BS1 and a second base substrate BS2 may be a silicon substrate, a plastic substrate, a glass substrate, an insulating film, or a laminated structure including a plurality of insulating layers.

A circuit element layer ML-D may be disposed on the first base substrate BS1. The circuit element layer ML-D may include a plurality of insulating layers, a plurality of conductive layers, and a semiconductor layer. The conductive layers, of the circuit element layer ML-D may form signal lines or a control circuit of a pixel.

The display element layer EML may be disposed on the circuit element layer ML-D. The display element layer EML may include organic light emitting diodes, however, this is merely an example. The display element layer EML according to an embodiment of the present disclosure may include inorganic light emitting diodes, organic-inorganic light emitting diodes, or a liquid crystal layer.

The second base substrate BS2 may be disposed on the display element layer EML. A predetermined space may be formed between the second base substrate BS2 and the display element layer EML. The space may be filled with air or inert gas. In addition, in the present embodiment, the space may be filled with a filler, such as a silicon-based polymer, an epoxy-based resin, or an acrylic-based resin.

A sensing circuit layer ML-T may be disposed on the second base substrate BS2. The sensing circuit layer ML-T may include a plurality of insulating layers and a plurality of conductive layers. The sensing circuit layer ML-T may include the same conductive layers and insulating layers as those of the input sensing panel ISP described with reference to FIG. 3B.

The coupling member SLM may be disposed between the first base substrate BS1 and the second base substrate BS2. The coupling member SLM may couple the first base substrate BS1 with the second base substrate BS2. The coupling member SLM may include an organic material, such as a light curable resin or a light plastic resin, or an inorganic material such as a frit seal, however, it should not be limited thereto. In FIG. 4, the coupling member SLM is disposed on opposite sides of the display panel DP-1.

Figure 5A:
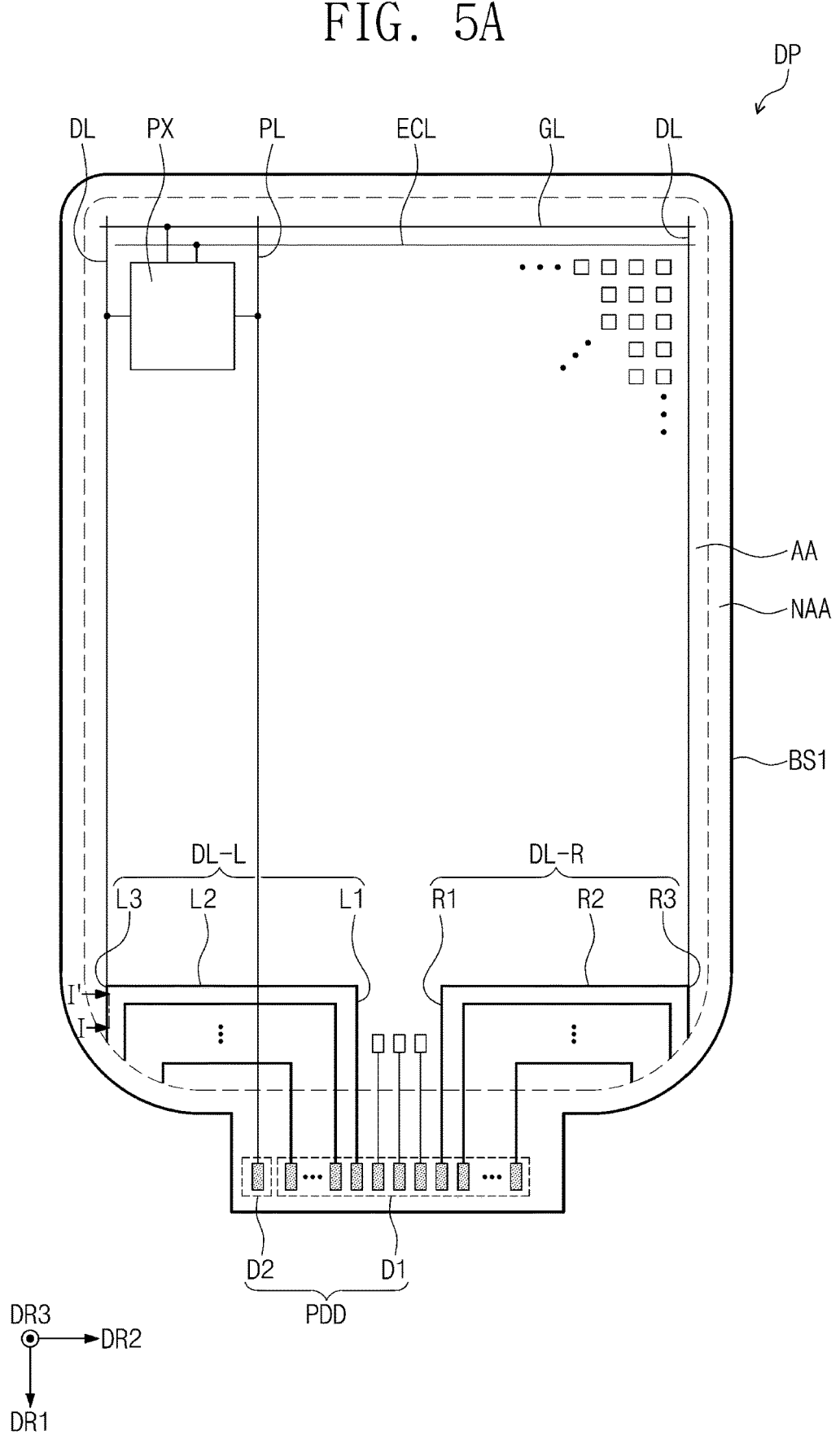
FIG. 5A is a plan view showing a display panel according to an embodiment of the present disclosure.
Figure 5B:
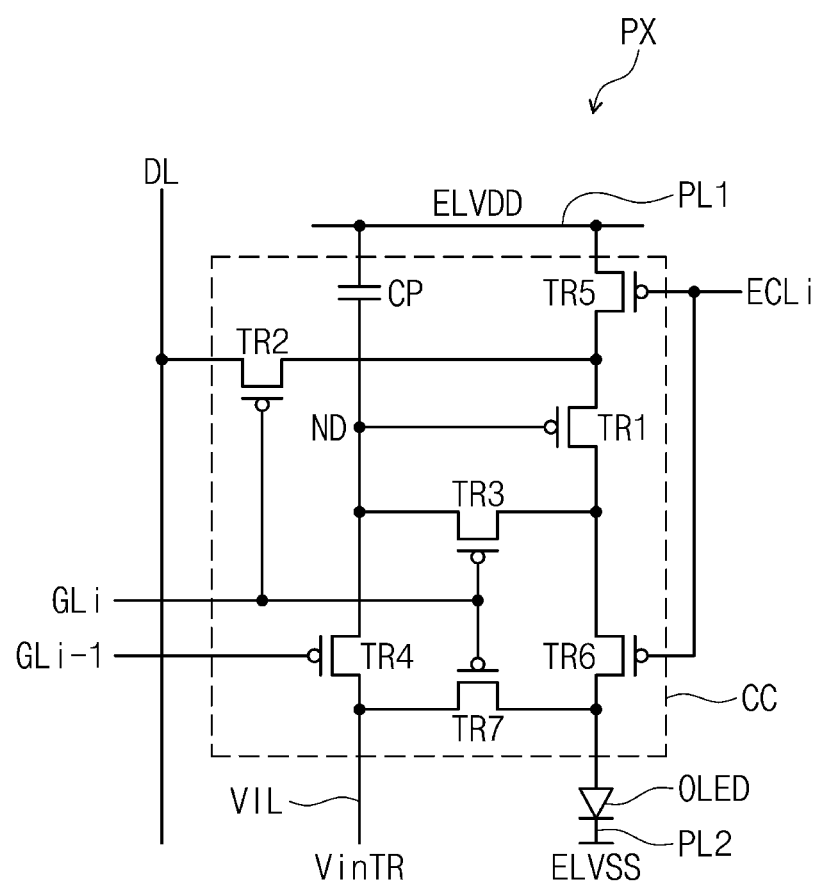
FIG. 5B is an equivalent circuit diagram showing a pixel according to an embodiment of the present disclosure.
Figure 5C:
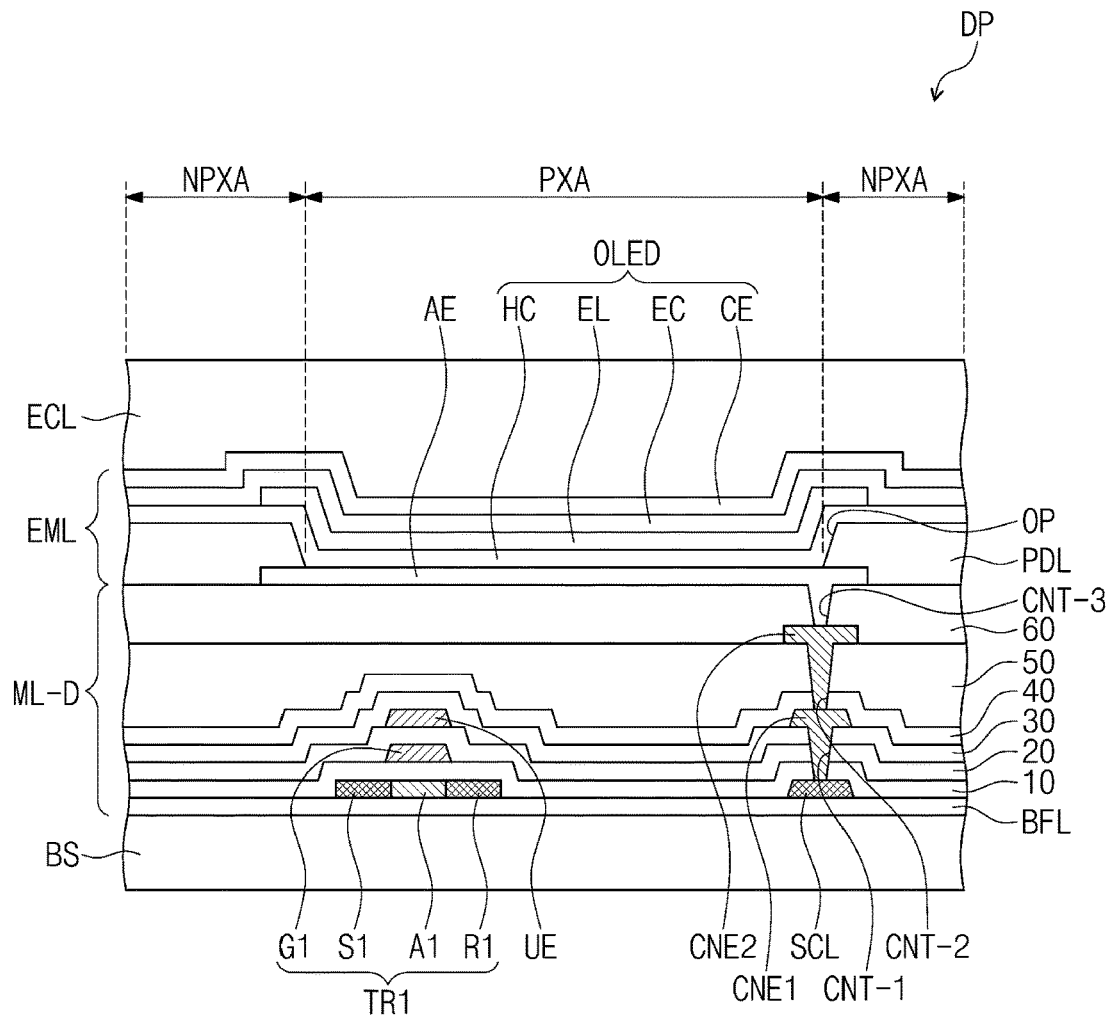
FIG. 5C is a cross-sectional view showing a display panel according to an embodiment of the present disclosure.
Figure 5D:
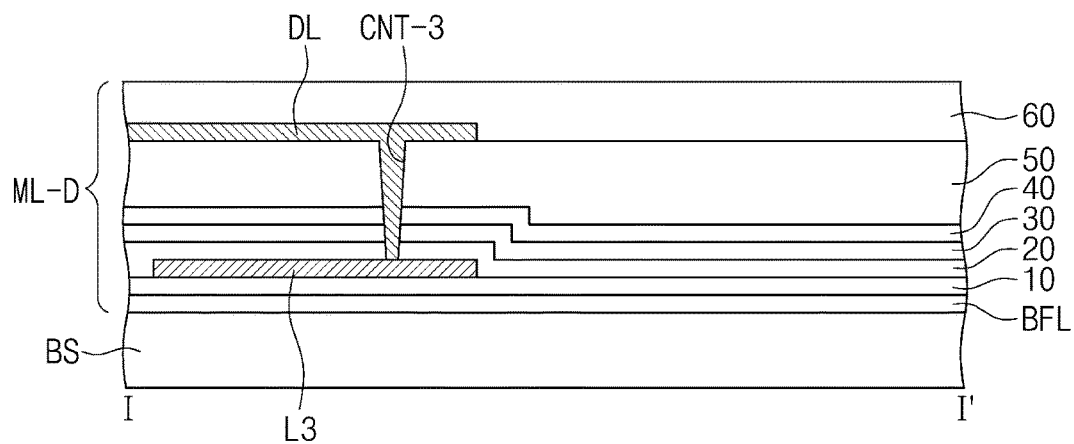

FIG. 5A is a plan view showing the display panel DP according to an embodiment of the present disclosure. FIG. 5B is an equivalent circuit diagram showing a pixel PX according to an embodiment of the present disclosure. FIG. 5C is a cross-sectional view showing the display panel DP according to an embodiment of the present disclosure. FIG. 5D is a cross-sectional view taken along a line I-I' shown in FIG. 5A.

Referring to FIG. 5A, the display panel DP may include a plurality of pixels PX, a plurality of signal lines GL, DL, PL, and ECL, a plurality of display pads PDD, and a plurality of routing lines DL-L and DL-R.

The active area AA of the display panel DP may be the area through which the image is displayed, and the peripheral area NAA of the display panel DP may be the area it which the driving circuit or the driving line is disposed.

Edges of both ends of the display panel DP, which are disposed at a lower portion of the display panel DP in the first direction DR1, according to the present embodiment may have a rounded shape, and an area in which the display pads PDD are arranged may be provided between the edges to protrude in the first direction DR1.

The signal lines GL, DL, PL, and ECL may be connected to the pixels PX to transmit the electrical signals to the pixels PX. Among the signal lines included in the display panel DP, a gate line GL, a data line DL, a power line PL, and a light emitting control line ECL are shown, however, these are merely examples. The signal lines GL, DL, PL, and ECL may further include an initialization voltage line and should not be limited to a particular embodiment.

A power pattern may be disposed in the peripheral area NAA. The power pattern may be connected to a plurality of power lines PL. As the display panel DP includes the power pattern, the pixels PX may receive the same first power supply signal.

The display pads PDD may include a first pad D1 and a second pad D2. The first pad D1 may be provided in plural, and the first pads D1 may be respectively connected to the data lines DL. The second pad D2 may be connected to the power pattern to be electrically connected to the power line PL. The display panel DP may apply the electrical signals, which are provided from the outside through the display pads PDD, to the pixels PX. The display pads PDD may further include pads to receive other electrical signals in addition to the first and second pads D1 and D2 and should not be limited to a particular embodiment.

At least one of the data lines DL according to the present embodiment may be connected to the first pad D1 through the routing lines DL-L and DL-R.

The routing lines DL-L and DL-R may include first routing lines DL-L disposed at a left side of the display panel DP and second routing lines DL-R disposed at a right side of the display panel DP. For example, a leftmost data line DL may be connected to one of the first routing lines DL-L and a rightmost data line DL may be connected to one of the second routing lines DL-R.

Each of the first routing lines DL-L may include a first line L1 disposed adjacent to a center of the display panel DP and extending in the first direction DR1, a second line L2 extending in second direction DR2, and a third line L3 connected to the data lines DL and extending in the first direction DR1. The second line L2 may be disposed between the first line L1 and the third line L3. Each of the second routing lines DL-R may include a first line R1 disposed adjacent to a center of the display panel DP and extending in the first direction DR1, a second line R2 extending in the second direction DR2, and a third line R3 connected to the data lines DL and extending in the first direction DR1. The second line R2 may be disposed between the first line R1 and the third line R3.

The second line L2 and the third line L3 may be disposed in the active area AA of the display panel DP. The first line L1 may extend to the peripheral area NAA from the active area AA and may be connected to a corresponding first pad D1.

The third line L3 may be disposed on a different layer from the data lines DL and may be connected to a corresponding data line via a contact hole formed through an insulating layer disposed on the third line L3.

The pixel PX may be electrically connected to the signal lines. FIG. 5B shows gate lines GLi and GLi-1, the data line DL, a first power line PL1, a second power line PL2, an initialization power line VIL, and a light emitting control line ECLi. However, these are merely examples, and the pixel PX according to the present embodiment may be further connected to various signal lines, and some of the signal lines shown in FIG. 5B may be omitted.

The pixel PX includes a light emitting element OLED and a pixel circuit CC. The pixel circuit CC includes a plurality of transistors TR1 to TR7 and a capacitor CP. The pixel circuit CC controls an amount of current flowing through the light emitting element OLED in response to a data signal.

The light emitting element OLED emits a light at a predetermined luminance response to the amount of the current provided from the pixel circuit CC. To accomplish this, a first power voltage ELVDD has a level that is set higher than a level of a second power voltage ELVSS.

Each of the transistors TR1 to TR7 includes an input electrode (or source electrode), an output electrode (or drain electrode), and a control electrode (or gate electrode). In the following descriptions, for the convenience of explanation, one electrode of the input electrode and the output electrode is referred to as a "first electrode", and the other electrode of the input electrode and the output electrode is referred to as a "second electrode".

A first electrode of a first transistor TR1 is connected to the first power line PL1 via a fifth transistor TR5. The first power line PL1 transmits the first power voltage ELVDD. A second electrode of the first transistor TR1 is connected to an anode electrode of the light emitting element OLED via a sixth transistor TR6. The first transistor TR1 may be referred to as a "driving transistor" in the present disclosure.

The first transistor TR1 controls the amount of the current flowing through the light emitting element OLED in response to a voltage applied to a control electrode of the first transistor TR1.

A second transistor TR2 is connected between the data line DL and the first electrode of the first transistor TR1. A control electrode of the second transistor TR2 is connected to an i-th gate line GLi. When an i-th signal is applied to the i-th gate line GLi, the second transistor TR2 is turned on and electrically connects the data line DL to the first electrode of the first transistor TR1. In this case, a data voltage of the data line DL may be applied to the first electrode of the first transistor TR1.

A third transistor TR3 is connected between the second electrode of the first transistor TR1 and the control electrode of the first transistor TR1. A control electrode of the third transistor TR3 is connected to the i-th gate line GLi. When the i-th gate signal is applied to the i-th gate line GLi, the third transistor TR3 is turned on and electrically connects the second electrode of the first transistor TR1 to the control electrode of the first transistor TR1. Accordingly, when the third transistor TR3 is turned on, the first transistor TR1 is connected in a diode configuration.

A fourth transistor TR4 is connected between a node ND and the initialization power line VIL. A control electrode of the fourth transistor TR4 is connected to an (i−1)th gate line GLi-1. The node ND is a node at which the fourth transistor TR4 is connected to the control electrode of the first transistor TR1. When an (i−1)th gate signal is applied to the (i−1)th gate line GLi-1, the fourth transistor TR4 is turned on and provides an initialization voltage Vint to the node ND. In this case, the initialization voltage Vint is also provided to the control electrode of the first transistor TR1.

The fifth transistor TR5 is connected between the first power line PL1 and the first electrode of the first transistor TR1. The sixth transistor TR6 is connected between the second electrode of the first transistor TR1 and the anode electrode of the light emitting element OLED. A control electrode of the fifth transistor TR5 and a control electrode of the sixth transistor TR6 are connected to an i-th light emitting control line ECLi.

A seventh transistor TR7 is connected between the initialization power line VIL and the anode electrode of the light emitting element OLED. A control electrode of the seventh transistor TR7 is connected to the i-th gate line GLi. When the i-th gate signal is applied to the i-th gate line GLi, the seventh transistor TR7 is turned on and provides the initialization voltage Vint to the anode electrode of the light emitting element OLED.

The seventh transistor TR7 may improve a black expression ability. For example, when the seventh transistor TR7 is turned on, a parasitic capacitance of the light emitting element OLED is discharged. Accordingly, when implementing a black luminance, the light emitting element OLED does not emit the light due to a leakage current from the first transistor TR1, and thus, the black expression ability may be improved.

In FIG. 5B, the control electrode of the seventh transistor TR7 is connected to the i-th gate line GLi, however, it should not be limited thereto or thereby. According to another embodiment, the control electrode of the seventh transistor TR7 may be connected to the (i−1)th gate line GLi-1 or an (i+1)th gate line.

FIG. 5B shows a p-channel metal-oxide-semiconductor (PMOS) as a reference of the pixel circuit CC, however, it should not be limited thereto or thereby. According to another embodiment, the pixel circuit CC may be implemented by an n-channel metal-oxide-semiconductor (NMOS). According to another embodiment, the pixel circuit CC may be implemented by a combination of the NMOS and the PMOS.

The capacitor CP is disposed between the first power line PL1 and the node ND. The capacitor CP is charged with a voltage corresponding to the data signal. When the fifth and sixth transistors TR5 and TR6 are turned on, the amount of the current flowing through the first transistor TR1 is determined by the voltage charged in the capacitor CP.

The light emitting element OLED is electrically connected to the sixth transistor TR6 and the second power line PL2. The light emitting element OLED receives the second power voltage ELVSS through the second power line PL2. The light emitting element OLED may include a light emitting layer.

The light emitting element OLED emits the light in response to a voltage corresponding to a difference in voltage between the signal provided through the sixth transistor TR6 and the second power voltage ELVSS provided through the second power line PL2.

In the present disclosure, the equivalent circuit of the pixel PX should not be limited to the equivalent circuit shown in FIG. 5B. According to another embodiment of the present disclosure, the pixel PX may be implemented in various ways to allow the light emitting element OLED to emit the light.

Referring to FIG. 5C, the display panel DP may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned by a photolithography process. Thus, the semiconductor pattern, the conductive pattern, and the signal line included in the circuit element layer ML-D and the display element layer EML may be formed.

The base substrate BS may include a synthetic resin film. In addition, the base substrate BS may include a glass substrate, a metal substrate, or an organic/inorganic composite substrate.

At least one inorganic layer may be disposed on are upper surface of the base substrate BS. A buffer layer BFL may increase a coupling force between the base substrate BS and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon, however, it should not be limited thereto or thereby. The semiconductor pattern may include amorphous silicon or metal oxide.

FIG. 5C shows only a portion of the semiconductor pattern, and the semiconductor pattern may be further disposed in other light emitting areas PXA in a plane. The semiconductor pattern may be arranged with a specific design rule over the light emitting areas PXA. The semiconductor pattern may have different electrical properties depending on whether it is doped. The semiconductor pattern may include a doped region and a non-doped region. The doped region may be doped with an N-type dopant or a P-type dopant. A P-type transistor may include a doped region doped with the P-type dopant.

The doped region may have a conductivity greater than that of the non-doped region and may serve as an electrode or signal line. The non-doped region may correspond to an active (or channel) of the transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

As shown in FIG. 5C, a source S1, an active A1, and a drain R1 of the transistor TR1 may be formed from the semiconductor pattern. FIG. 5C shows a portion of a connection signal line SCL formed from the semiconductor pattern. The connection signal line SCL may be connected to the drain R1 of the transistor TR1 in a plane.

First, second, third, fourth, fifth, and sixth insulating layers 10, 20, 30, 40, 50, and 60 may be disposed on the buffer layer BFL. The first to sixth insulating layers 10 to 60 may be an inorganic layer or an organic layer. A gate G1 may be disposed on the first insulating layer 10. An upper electrode UE may be disposed on the second insulating layer 20. A first connection electrode CNE1 may be disposed on the third insulating layer 30. The first connection electrode CNE1 may be connected to the connection signal line SCL through a contact hole CNT-1 provided through the first, second, and third insulating layers 10, 20, and 30. A second connection electrode CNE2 may be disposed on the fifth insulating layer 50. The second connection electrode CNE2 may be connected to the first connection electrode CNE1 through a contact hole CNT-2 provided through the fourth and fifth insulating layers 40 and 50.

The light emitting element OLED may be disposed on the sixth insulating layer 60. A first electrode AE may be disposed on the sixth insulating layer 60. The first electrode AE may be the anode electrode of the light emitting element OLED. The first electrode AE may be connected to the second connection electrode CNE2 through a contact hole CNT-3 provided through the sixth insulating layer 60. An opening OP (hereinafter, referred to as a "light emitting opening") may be provided its a pixel definition layer PDL. At least a portion of the first electrode AE may be exposed through the light emitting opening OP.

The pixel definition layer PDL mays have a black color. The pixel definition layer PDL may include a black coloring agent. The pixel definition layer PDL may include a black pigment or a black dye mixed with a base resin.

FIG. 5C shows the light emitting area PXA and a non-light-emitting area NPXA adjacent to the light emitting area PXA. The light emitting area PXA may to correspond to the portion of the first electrode AE exposed through the light emitting OP.

A hole control layer HC may be disposed in the light emitting area PXA and the non-light-emitting area NPXA. The hole control layer HC may include a hole transport layer and may further include a hole injection layer. A light emitting layer EL may be disposed on the hole control layer HC. The light emitting layer EL may be disposed in an area corresponding to the light emitting opening OP. In other words, the light emitting layer EL may be formed in each of the light emitting areas PXA after being divided into portions.

An electron control layer EC may be disposed on the light emitting layer EL. The electron control layer EC may include an electron transport layer and may further include an electron injection layer. A second electrode CE may be disposed on the electron control layer EC. The second electrode CE may be the cathode electrode of the light emitting element OLED.

The thin film encapsulation layer ECL may be disposed on the second electrode CE. The thin film encapsulation layer ECL may correspond to the thin encapsulation layer ECL described with reference to FIGS. 3A and 3B.

FIG. 5D shows an arrangement relationship between the third line L3 and the data line DL.

The first and second, routing lines DL-L and DL-R according to the present disclosure may be disposed on the same layer as the gate G1 and the upper electrode UE. FIG. 5D shows a structure in which the third line L3 among the first and second routing lines DL-L and DL-R is disposed on the same layer, e.g., the first insulating layer 10, as the gate G1.

The data line DL may be disposed on the same layer as the second connection electrode CNE2. The data line DL may be connected to the third line L3 through the contact hole CNT-3 provided through the second insulating layer 20 to the fifth insulating layer 50.

According to the display panel DP of the present disclosure, as the pixels PX disposed adjacent to the rounded area of the display panel DP may be connected to corresponding data lines DL through the first and second routing lines DL-L and DL-R overlapping the active area AA, the number of the lines passing through the peripheral area NAA in the rounded area may be reduced. Accordingly, interference between lines receiving different signals from each other may be reduced, and the reliability of pixels PX disposed adjacent to the rounded area may be increased.

Figure 6A:
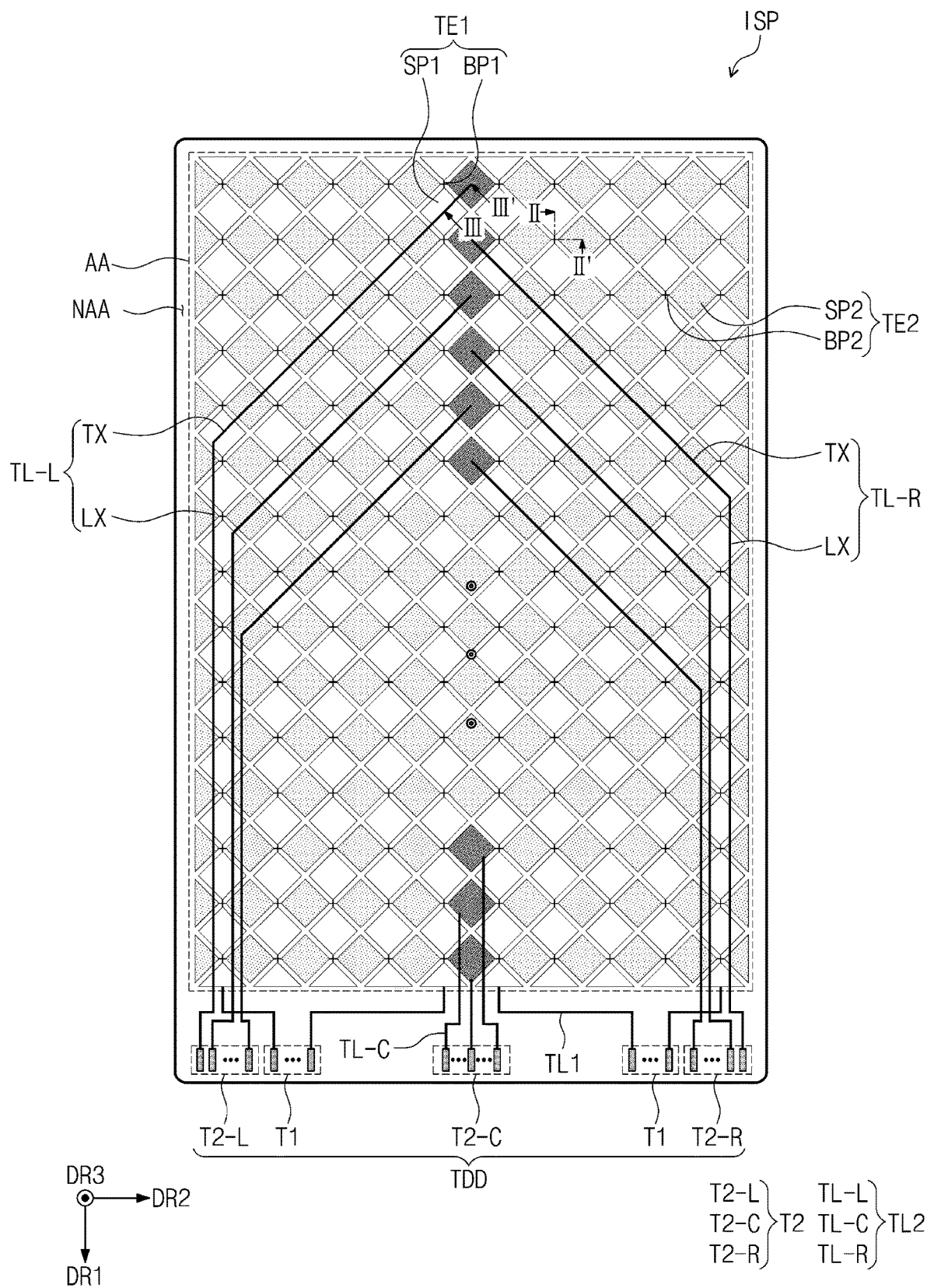
FIG. 6A is a plan view showing an input sensing panel according to an embodiment of the present disclosure.
Figure 6B:
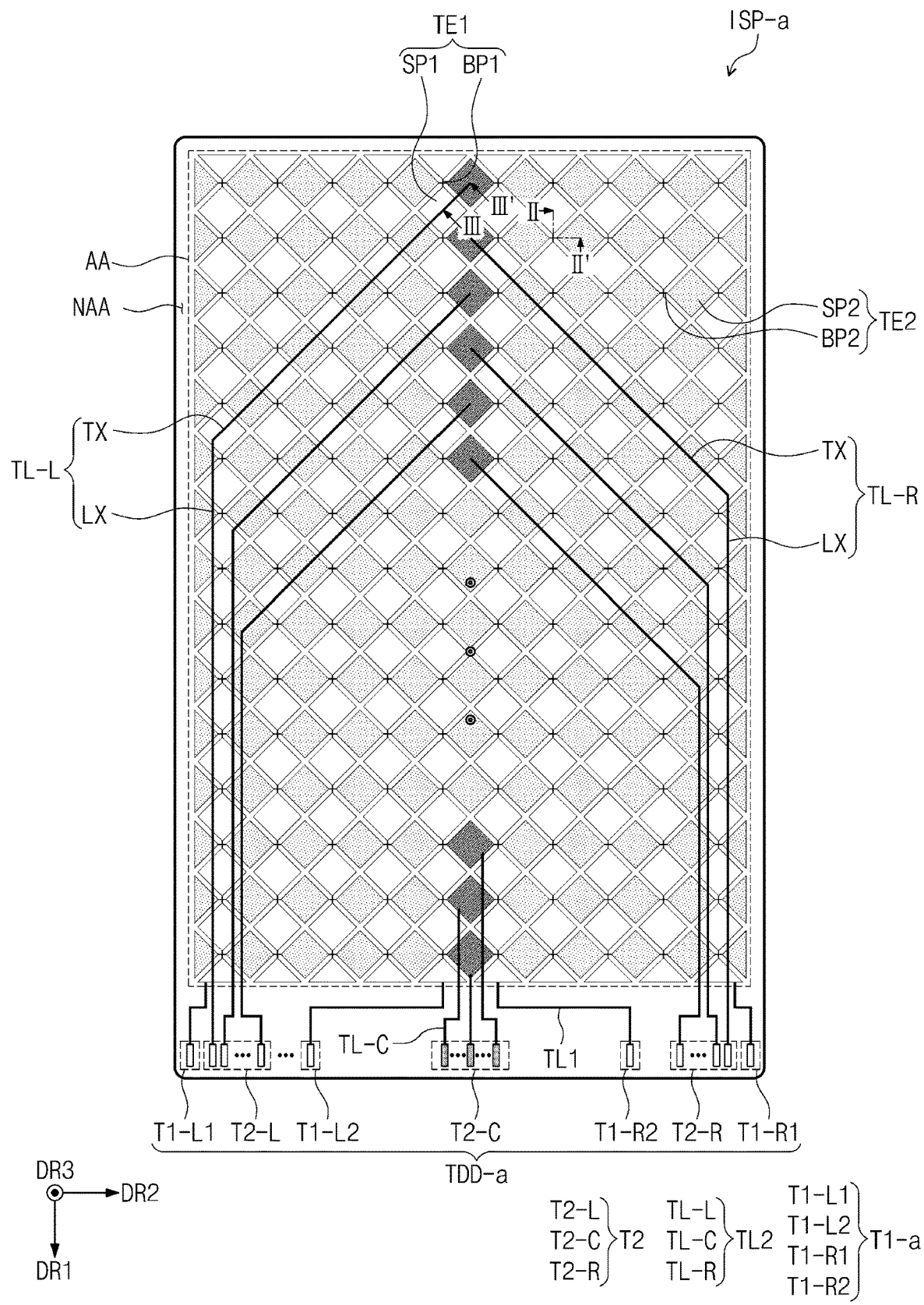
FIG. 6B is a plan view showing an input sensing panel according to an embodiment of the present disclosure.
Figure 7:
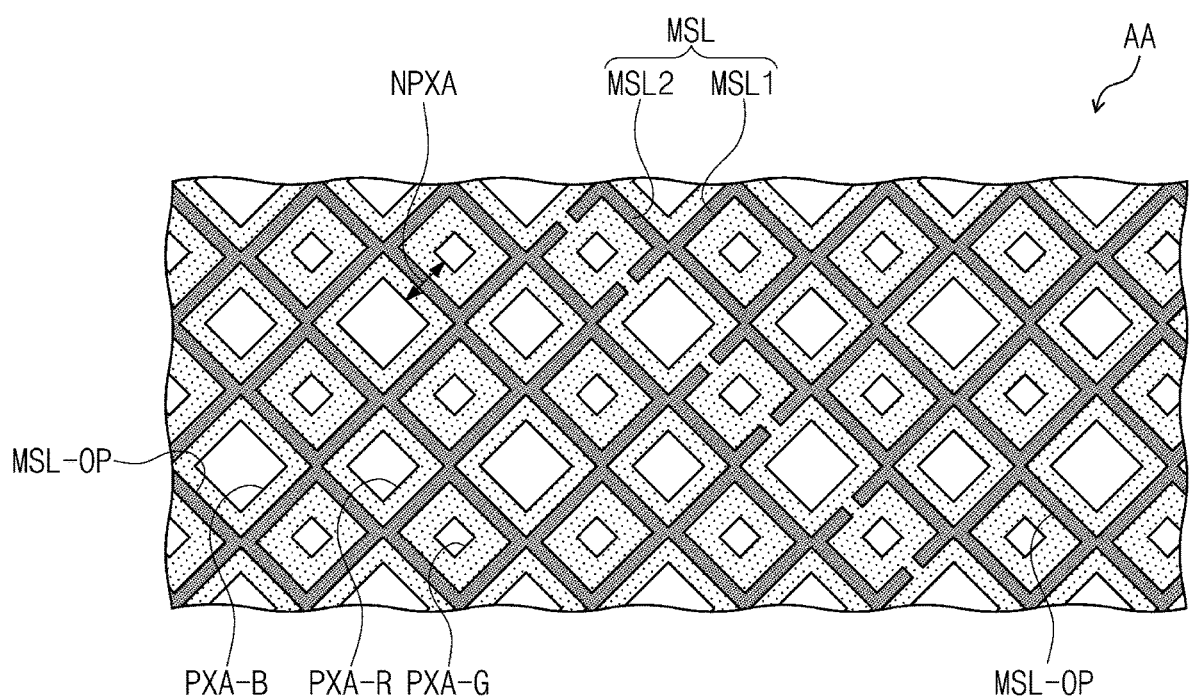
FIG. 7 is a plan view showing an arrangement relationship between light emitting areas and an input sensing panel according to an embodiment of the present disclosure.
Figure 7:
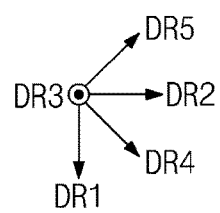
Figure 8A:
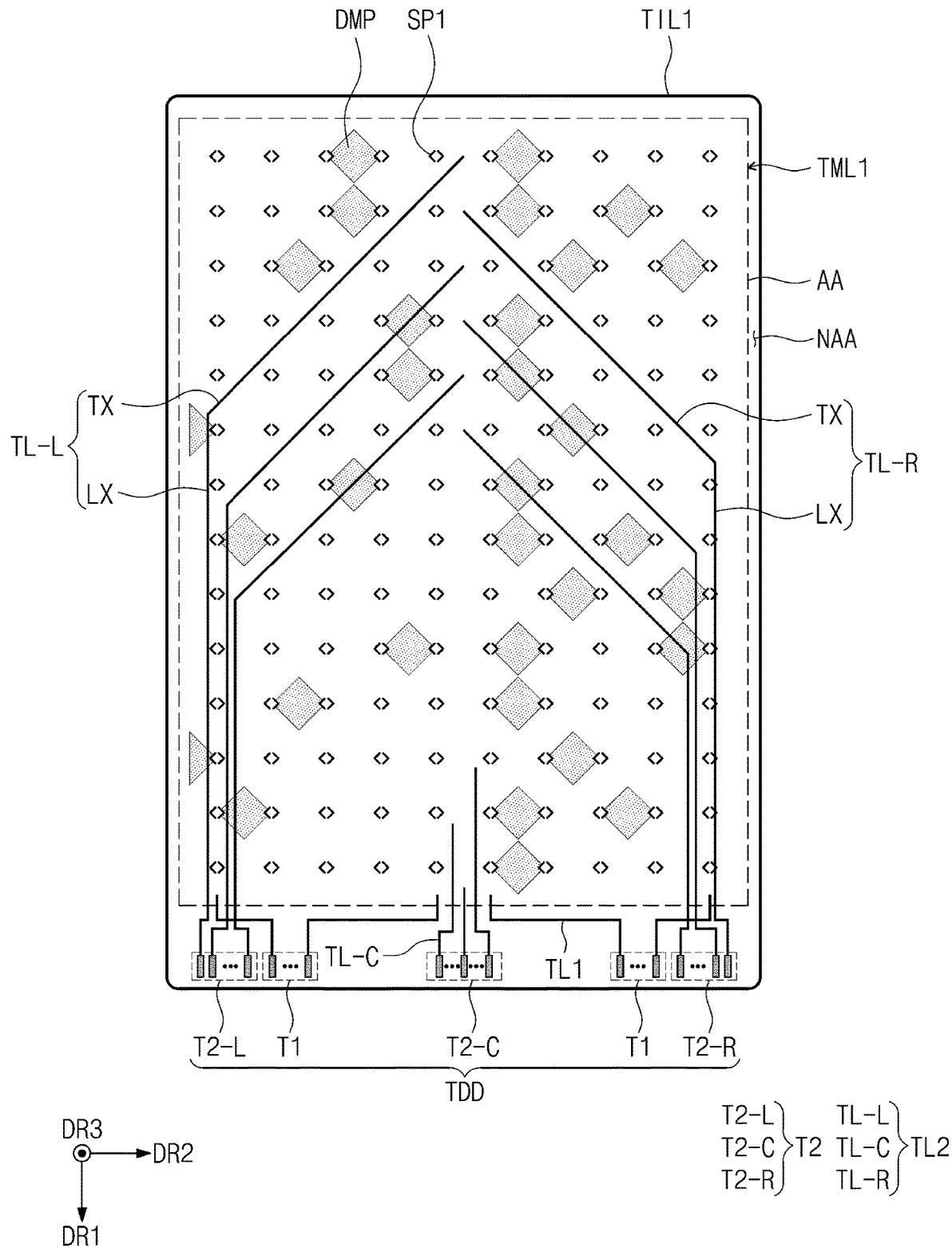
FIG. 8A is a plan view showing a component of an input sensing panel according to an embodiment of the present disclosure.
Figure 8B:
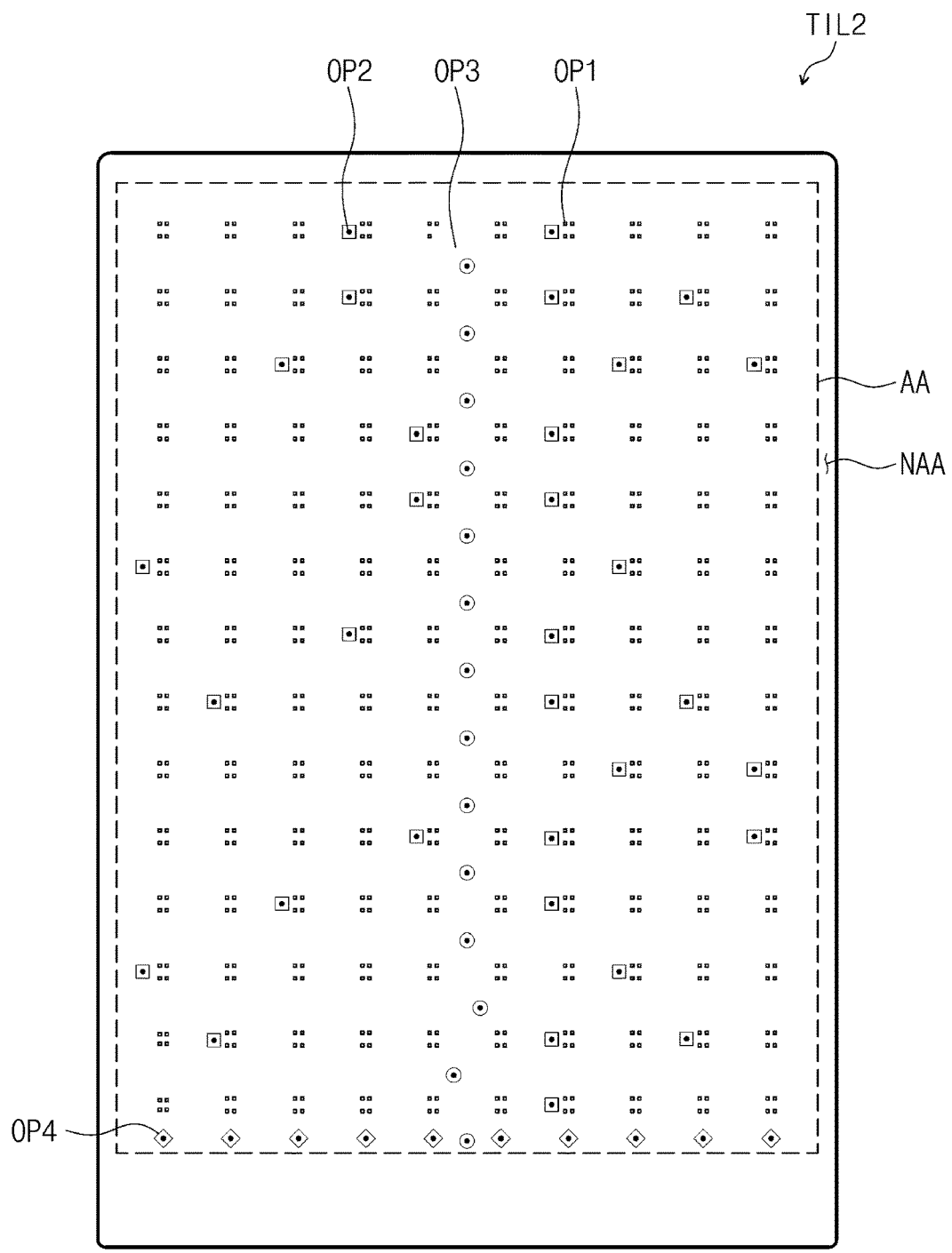
FIG. 8B is a plan view showing a component of an input sensing panel according to an embodiment of the present disclosure.
Figure 8B:
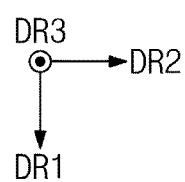
Figure 8C:
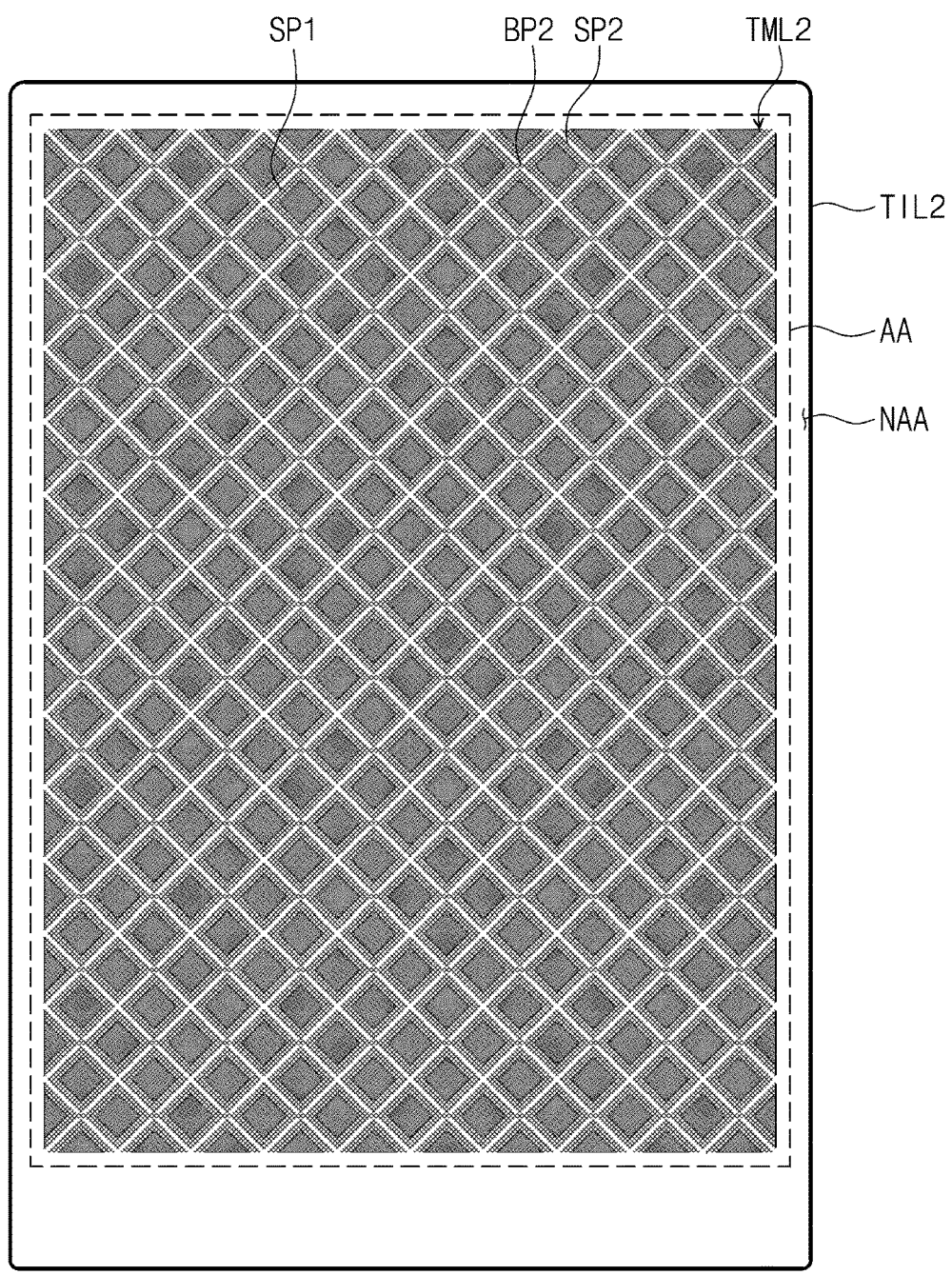
FIG. 8C is a plan view showing a component of an input sensing panel according to an embodiment of the present disclosure.
Figure 8D:
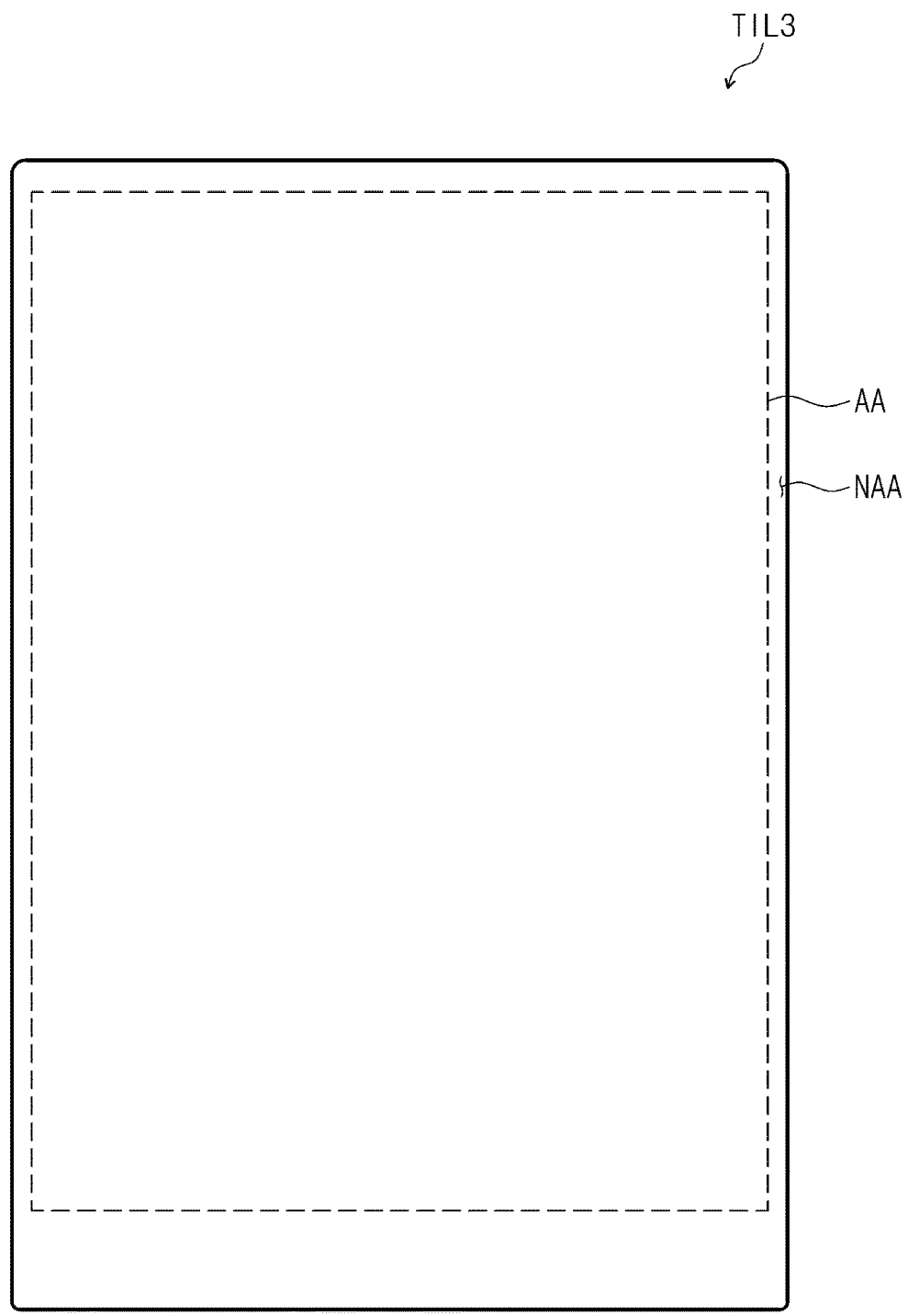
FIG. 8D is a plan view showing a component of an input sensing panel according to an embodiment of the present disclosure.
Figure 9:
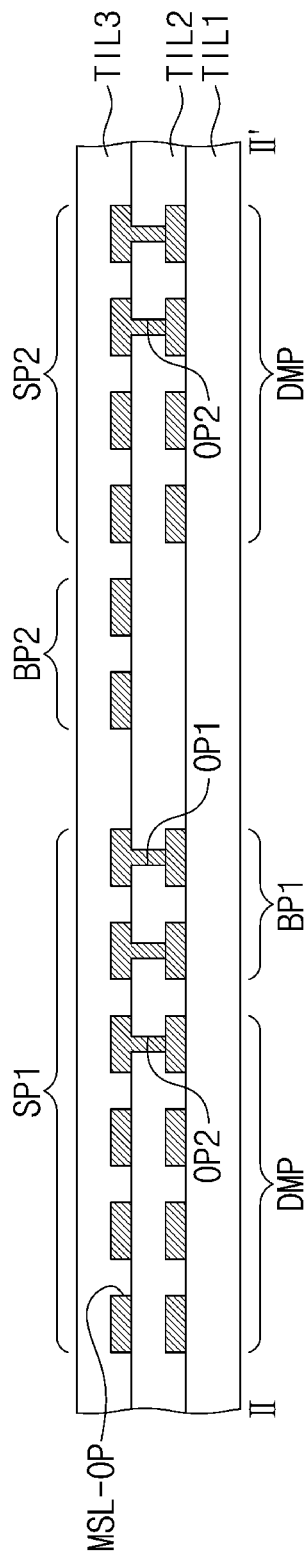
FIG. 9 is a cross-sectional view taken along a line II-II' shown in FIG. 6A.
Figure 10:
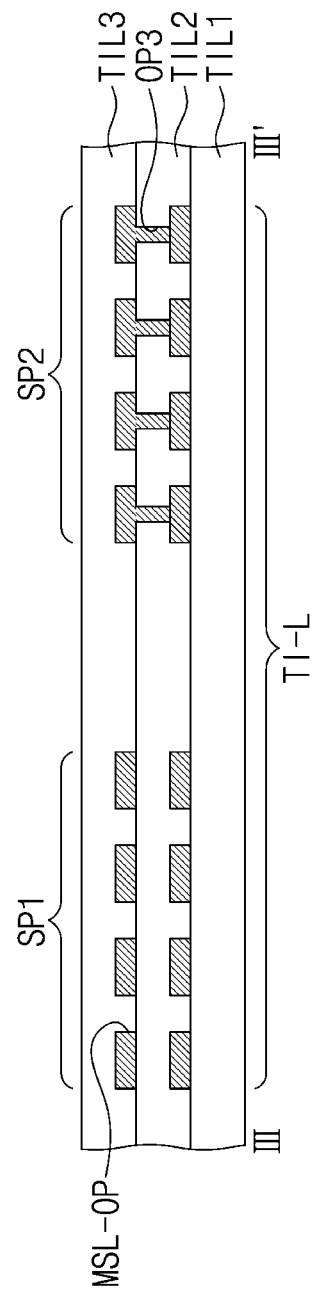
FIG. 10 is a cross-sectional view taken along a line III-III' shown in FIG. 6A.

FIG. 6A is a plan view showing an input sensing panel ISP according to an embodiment of the present disclosure. FIG. 6B is a plan view showing an input sensing panel ISP-a according to an embodiment of the present disclosure. FIG. 7 is a plan view showing an arrangement relationship between light emitting areas and an input sensing panel according to an embodiment of the present disclosure. FIG. 8A is a plan view showing a component of the input sensing panel according to an embodiment of the present disclosure. FIG. 8B is a plan view showing a component of the input sensing panel according to an embodiment of the present disclosure. FIG. 8C is a plan view showing a component of the input sensing panel according to an embodiment of the present disclosure. FIG. 8D is a plan view showing a component of the input sensing panel according to an embodiment of the present disclosure. FIG. 9 is a cross-sectional view taken along a line II-II' shown in FIG. 6A. FIG. 10 is a cross-sectional view taken along a line III-III' shown in FIG. 6A.

Referring to FIG. 6A, the input sensing panel ISP may include a first sensing electrode TE1, a second sensing electrode TE2, a first trace line TL1, a second trace line TL2, and sensing pads TDD.

The first sensing electrode TE1 may extend in the first direction DR1. The first sensing electrode TE1 may be provided in plural, and the first sensing electrodes TE1 may be arranged in the second direction DR2. The first sensing electrodes TE1 may include a plurality of first sensing patterns SP1 arranged in the first direction DR1 and first bridge patterns BP1 disposed between the first sensing patterns SP1 to connect the first sensing patterns SP1 adjacent to each other. The first sensing patterns SP1 are also arranged in the second direction DR2.

The second sensing electrode TE2 may be disposed to be insulated from the first sensing electrode TE1. The second sensing electrode TE2 may extend in the second direction DR2. The second sensing electrode TE2 may be provided in plural, and the second sensing electrodes TE2 may be arranged in the first direction DR1. The second sensing electrode TE2 may include a plurality of second sensing patterns SP2 arranged in the second direction DR2 and second bridge patterns BP2 disposed between the second sensing patterns SP2. The second sensing patterns SP2 and the second bridge patterns BP2 may be a single pattern. The second sensing patterns SP2 are also arranged in the first direction DR1.

The input sensing panel ISP may sense a variation in mutual-capacitance between the first sensing electrodes TE1 and the second sensing electrodes TE2 to sense the external input or may sense a variation in self-capacitance of each of the first sensing electrodes TE1 and the second sensing electrodes TE2 to sense the external input. The input sensing panel ISP may sense the external input in various methods, and the method of sensing the external input should not be particularly limited.

The first trace line TL1 may be provided in plural, and each of the first trace lines TL1 may be connected to a corresponding first sensing electrode TE1. The first trace line TL1 may be disposed in the peripheral area NAA, and thus, the first trace line TL1 may not be viewed from the outside. FIG. 6A shows the first trace line TL1 connected to one end of the first sensing electrode TE1, however, the first trace line TL1 should not be limited thereto or thereby. For example, a portion of the first trace line TL1 may enter the active area AA and connect with the first sensing electrode TE1. According to another embodiment, the first trace line TL1 may be connected to an end of the first sensing electrode TE1 via the peripheral area NAA, however, it should not be particularly limited.

Among the first trace lines TL1, the first trace lines overlapping the second trace line TL2 may be disposed on a different layer from the second trace line TL2 and may be insulated from the second trace line TL2.

The second trace line TL2 may be provided in plural, and each of the second trace lines TL2 may be connected to a corresponding second sensing electrode among the second sensing electrodes TE2. In the present disclosure, at least a portion of the second trace line TL2 may overlap the active area AA.

The second trace line TL2 may include side lines TL-L and TL-R and center lines TL-C. The side lines TL-L and TL-R may include first lines TL-L and second lines TL-R spaced apart from the first lines TL-L with the center lines TL-C interposed therebetween. For example, the first lines TL-L may be disposed at a left side of the input sensing panel ISP when compared with the second lines TL-R with respect to the center lines TL-C, and the second lines TL-R may be disposed at a right side of the input sensing panel ISP when compared with the first lines TL-L with respect to the center lines TL-C.

Each of the side lines TL-L and TL-R may include a diagonal portion TX and an extension portion LX. The diagonal portion TX may extend in a diagonal direction of the first direction DR1 and the second direction DR2, and the extension portion LX may extend in the first direction DR1 from the diagonal portion TX. The diagonal portion TX may be a slanted portion and extend in a direction slanted with respect to the first or second directions DR1 or DR2, for example.

According to the present disclosure, at least a portion of the center lines TL-C and the side lines TL-L and TL-R may overlap the active area AA. The side lines TL-L and TL-R and the center lines TL-C may be connected to the second sensing patterns SP2 included in different second sensing electrodes TE2.

The second sensing patterns SP2 connected to the side lines TL-L and TL-R and the center lines TL-C may be the second sensing patterns SP2 disposed at a center of the input sensing panel ISP. In FIG. 6A, the second sensing patterns SP2 connected to the side lines TL-L and TL-R are shown with dark hatchings as a representative example.

The extension portion LX may extend in the first direction DR1. The extension portion LX may overlap the first sensing patterns SP1 included in the same first sensing electrode TE1 among the first sensing patterns SP1. In other words, in FIG. 6A, the extension portion LX of the first line TL-L may overlap a plurality of first sensing patterns SP1 of the first sensing electrode TE1 arranged at the leftmost side of the input sensing panel ISP. A first end of the extension portion LX may be connected to sensing pad T2-L and T2-R, and a second end of the extension portion LX, which faces the first end of the extension portion LX, may extend from the diagonal portion TX.

The diagonal portion TX may extend in the diagonal direction of the first direction DR1 and the second direction DR2. The diagonal portion TX may overlap the first sensing patterns SP1 included in different first sensing electrodes TE1 from each other among the first sensing patterns SP1. For example, the uppermost diagonal portion TX shown in FIG. 6A may extend from one first sensing electrode TE1 to overlap four other first sensing electrodes TE1. A first end of the diagonal portion TX may extend from the second end of the extension portion LX, and a second end of the diagonal portion TX, which faces the first end of the diagonal portion TX, may be connected to a corresponding second sensing pattern.

According to the present embodiment, the second sensing patterns SP2 connected to be second trace line TL2 may be aligned with each other when viewed in the first direction DR1. In addition, the second sensing patterns SP2 connected to the first lines TL-L and the second sensing patterns SP2 connected to the second lines TL-R may be alternately arranged with each other in the first direction DR1.

FIG. 6A shows a structure in which the second sensing patterns SP2 connected to the first lines TL-L and the second sensing patterns SP2 connected to the second lines TL-R are alternately arranged one by one, however, they should not be limited thereto or thereby. The second sensing patterns SP2 connected to the first lines TL-L and the second sensing patterns SP2 connected to the second lines TL-R may be alternately arranged in plural or in different numbers, however, they should not be particularly limited.

The center lines TL-C may extend in the first direction DR1 and may overlap the active area AA. The center lines TL-C may be connected to the second sensing patterns SP2 of the second sensing electrode TE2, which are not connected by the side lines TL-L and TL-R. The second sensing patterns SP2 connected to the center lines TL-C may be aligned with the second sensing patterns SP2 connected to the side lines TL-L and TL-R when viewed in the first direction DR1.

The sensing pads TDD may include a first sensing pad T1 and a second sensing pad T2. The second sensing pad T2 may include a left sensing pad T2-L, a center sensing pad T2-C, and a right sensing pad T2-R.

The left sensing pad T2-L may be connected to the first lines TL-L, the center sensing pad T2-C may be connected to the center lines TL-C, and the right sensing pad T2-R may be connected to the second lines TL-R.

The shape, location, and number of the sensing pads TDD may be changed in various ways depending on the shape, location, and number of the first and second trace lines TL1 and TL2 and should not be particularly limited.

According to the present disclosure, since the second trace lines TL2 connected to the second sensing electrodes TE2 overlap the active area AA and a portion of the peripheral area NAA surrounding the active area AA, which is disposed at a lower end of the input sensing panel ISP, and do not overlap a remaining portion of the peripheral area NAA except for the peripheral area NAA disposed at the lower end of the input sensing panel ISP, the size of the peripheral area NAA of the input sensing panel ISP may be reduced.

Since the size of the peripheral area NAA required to arrange the second trace lines TL2 may be reduced, the electronic apparatus EA may have improved aesthetics.

In addition, since the second sensing patterns SP2 connected to the second trace lines TL2 are disposed at the center of the input sensing panel ISP, a delay of the signal transmitted/received by the second sensing patterns SP2 may be reduced compared to when the signal is provided through ogre of left and right sides of the input sensing panel ISP. Thus, the reliability of the input sensing panel ISP may be increased.

In addition, since the input sensing panel ISP includes the diagonal portion TX overlapping the first sensing patterns SP1 included in different first sensing electrodes TE1 among the first sensing patterns SP1, a parasitic capacitance may be reduced compared to when the diagonal portion TX overlaps only the first sensing patterns SP1 included in the same first sensing electrode TE1. Accordingly, the reliability of the input sensing panel ISP may be increased.

Referring to FIG. 6B, the input sensing panel ISP-a may include first sensing electrodes TE1, second sensing electrodes TE2, a first trace line TL1, a second trace line TL2, and sensing pads TDD-A. Since the first sensing electrodes TE1, the second sensing electrodes TE2, the first trace line TL1, and the second trace line TL2 of the input sensing panel ISP-a shown in FIG. 6B may have substantially the same configuration as those of the first sensing electrodes TE1, the second sensing electrodes TE2, the first trace line TL1, and the second trace line TL2 of the input sensing panel ISP described with reference to FIG. 6A, different features of the sensing pads TDD-a from the sensing pads TDD will be mainly described.

The sensing pads TDD-a may include a first sensing pad T1-a and a second sensing pad T2. The first sensing pad T1-a may include a first left sensing pad T1-L1, a second left sensing pad T1-L2, a first right sensing pad T1-R1, and a second right sensing pad T1-R2. The second sensing pad T2 may include a left sensing pad T2-L, a center sensing pad T2-C, and a right sensing pad T2-R.

The second sensing pad T2 may be connected to the second trace line TL2. The left sensing pad T2-L may be connected to first lines TL-L, the center sensing pad T2-C may be connected to center hoes TL-C, and the right sensing pad T2-R may be connected to second lines TL-R.

The first sensing pad T1-a may be connected to the first trace line TL1. In the present embodiment, the first left sensing pad T1-L1 may be spaced apart from the second left sensing pad T1-L2 with the left sensing pad T2-L interposed therebetween. Accordingly, even though the first lines TL-L are connected via the first sensing patterns SP1, the first trace line TL1 may be connected to the first left sensing pad T1-L1 and the second left sensing pad T1-L2, and the first lines TL-L may be connected to the left sensing pad T2-L without mutual interference.

In addition, the first right sensing pad T1-R1 may be spaced apart from the second right sensing pad T1-R2 with the right sensing pad T2-R interposed therebetween. Thus, even though the second lines TL-R are connected via the first sensing patterns SP1, the first trace line TL1 may be connected to the first right sensing pad T1-R1 and the second right sensing pad T1-R2, and the second lines TL-R may be connected to the right sensing pad T2-R without mutual interference.

According to an embodiment of the present disclosure an input sensing panel ISP may include: first sensing electrodes TE1 extending in a first direction DR1, arranged in a second direction DR2 crossing the first direction DR1, and including first sensing patterns SP1 arranged in the first direction DR1 and first bridge, patterns BP1 disposed between the first sensing patterns SP1; second sensing electrodes TE2 insulated from the first sensing electrodes TE1, extending in the second direction DR2, arranged in the first direction DR1, and including second sensing patterns SP2 arranged in the second direction DR2 and second bridge patterns BP2 disposed between the second sensing patterns SP2; a first trace line TL1 connected to the first sensing patterns SP1; and a second trace line TL2 connected to the second sensing patterns SP2, the second trace line TL2 including: side lines TL-L and TL-R each comprising a diagonal portion TX extending in a diagonal direction with respect to the first or second directions DR1 or DR2 and an extension portion LX extending in the first direction DR1 from the diagonal portion TX; and center lines TL-C extending in the first direction DR1, wherein the diagonal portion TX overlaps the first sensing patterns SP1 of different first sensing electrodes TE1 and the extension portion LX overlaps the first sensing patterns SP1 of the same first sensing electrode TE1.

FIG. 7 shows a relationship between the first and second sensing electrodes TE1 and TE2 included in the input sensing panel ISP and light emitting areas PXA-R, PXA-G, and PXA-B included in the display panel DP in the active area AA. The light emitting areas PXA described with reference to FIG. 5C may correspond to one of the light emitting areas PXA-R, PXA-G, and PXA-B.

The input sensing panel ISP according to the present disclosure may include a plurality of mesh lines MSL1 and MSL2 extending in a fourth direction DR4 and a fifth direction DR5. The mesh lines MSL1 and MSL2 may not overlap the light emitting areas PXA-R, PXA-G, and PXA-B and may overlap the non-light-emitting area NPXA. Accordingly, the light emitting openings OP in the pixel definition layer PDL may overlap and correspond to mesh openings MSL-OP.

The mesh lines MSL1 and MSL2 may define the mesh openings MSL-OP. Each of the mesh lines MSL1 and MSL2 may have a line width from a few micrometers to a few nanometers. The mesh openings MSL-OP may correspond to the light emitting areas PXA-R, PXA-G, and PXA-B in a one-to-one correspondence. FIG. 7 shows the light emitting areas PXA-R, PXA-G, and PXA-B grouped into three groups depending on emission colors thereof.

The light emitting areas PXA-R, PXA-G, and PXA-B may have sizes that differ depending on the color emitted from the light emitting layer EL of the light emitting element OLED. The sizes of the light emitting areas PXA-R, PXA-G, and PXA-B may be determined depending on the type of the light emitting element OLED.

The mesh openings MSL-OP may be grouped into some groups that have different sizes from each other. The mesh openings MSL-OP may be grouped into three groups according to the corresponding light emitting areas PXA-R, PXA-G, and PXA-B.

In the above descriptions, the structure in which the mesh openings MSL-OP correspond to the light emitting areas PXA-R, PXA-G, and PXA-B in a one-to-one correspondence is shown, however, it should not be limited thereto or thereby. One mesh opening MSL-OP may correspond to two or more light emitting areas PXA-R, PXA-G, and PXA-B.

In the above descriptions, the light emitting areas PXA-R, PXA-G, and PXA-B may have a variety of sizes, however, it should not be limited thereto or thereby. The sizes of the light emitting areas PXA-R, PXA-G, and PXA-B may be substantially the same as each other, and the sizes of the mesh openings MSL-OP may be substantially the same as each other.

According to the present disclosure, since the mesh lines MSL1 and MSL2 that form the sensing electrodes TE1 and TE2 do not overlap the light emitting areas PXA-R, PXA-G, and PXA-B, the light provided from the pixels PX may not be affected by the mesh lines MSL1 and MSL2. Accordingly, the electronic apparatus EA may have improved color purity.

FIGS. 8A to 8D are plan views showing the input sensing panel ISP separated into the sensing insulating layer and the conductive layer. Layers described with reference to FIGS. 8A to 8D may correspond to the layers of the input sensing panel ISP described with reference to FIG. 3B. The input sensing panel ISP (refer to FIG. 3B) according to the present disclosure may be formed by the sensing insulating layers TIL1, TIL2, and TIL3 and the conductive layers TML1 and TML2.

Referring to FIG. 8A, the first conductive layer TML1 may be disposed on the first sensing insulating layer TIL1. The first sensing insulating layer TIL1 may be disposed directly on the thin film encapsulation layer ECL described with reference to FIG. 3B.

The first conductive layer TML1 may include the first trace line TL1, the second trace line TL2, and the sensing pads TDD.

The second trace line TL2 may include the side lines TL-L and TL-R and the center lines TL-C. The side lines TL-L and TL-R may include the first lines TL-L and the second lines TL-R spaced apart from the first lines TL-L with the center lines TL-C interposed therebetween. For example, the first lines TL-L may be disposed at the left side of the input sensing panel ISP when compared with the second lines TL-R with respect to the center lines TL-C, and the second lines TL-R may be disposed at the right side of the input sensing panel ISP when compared with the first lines TL-L with respect to the center lines TL-C.

In FIG. 8A, the second trace line TL2 overlapping the active area AA is indicated by a solid line. The second trace line TL2 overlapping the active area AA may include the mesh lines MSL1 and MSL2 described with reference to FIG. 7 and may not overlap the light emitting areas PXA-R, PXA-G, and PXA-B described with reference to FIG. 7.

Each of the side lines TL-L and TL-R may include the diagonal portion TX and the extension portion LX. The diagonal portion TX may extend in the diagonal direction of the first direction DR1 and the second direction DR2, and the extension portion LX may extend in the first direction DR1 from diagonal portion TX.

According to the present embodiment, the first conductive layer TML1 may further include a floating pattern DMP. The floating pattern DMP may overlap at least one of the first sensing patterns SP1 and the second sensing patterns SP2.

The floating pattern DMP may be connected to the first and second sensing patterns SP1 and SP2 that are not connected to the first and second trace lines TL1 and TL2 among the first and second sensing patterns SP1 and SP2, and thus, may reduce a parasitic capacitance with respect to the sensing patterns adjacent thereto. The floating pattern DMP may be randomly disposed as long as the floating pattern DMP is disposed in an area overlapping the first and second sensing patterns SP1 and SP2. Accordingly, the floating pattern DMP may be disposed in the entirety of the active area AA, may be disposed to overlap only the first sensing patterns SP1, or may be disposed to overlap only the second sensing patterns SP2, however, it should not be particularly limited.

The floating pattern DMP may include the mesh lines MSL1 and MSL2 described with reference to FIG. 7 and may be provided with floating openings passing therethrough to overlap the mesh openings MSL-OP.

Accordingly, the mesh lines MSL1 and MSL2 of the floating pattern DMP may not overlap the light emitting areas PXA-R, PXA-G, and PXA-B described with reference to FIG. 7, and thus, the mesh lines MSL1 and MSL2 may not exert influences on the light provided from the pixels PX. Accordingly, the color purity of the electronic apparatus EA may be improved.

Referring to FIGS. 8B, 9, and 10, the second sensing insulating layer TIL2 may cover the first conductive layer TML1 and may be disposed above the first sensing insulating layer TIL1. The second sensing insulating layer TIL2 may include a plurality of contact holes OP1, OP2, OP3, and OP4. The contact holes OP1, OP2, OP3, and OP4 may be provided through the second sensing insulating layer TIL2. For the convenience of explanation, the contact holes OP1, OP2, OP3, and OP4 are shown in different shapes from each other.

The first sensing patterns SP1 and the first bridge patterns BP1 may be connected to each other through bridge contact holes OP1. The bridge contact holes OP1 may overlap corresponding first bridge patterns BP1.

The first and second sensing patterns SP1 and SP2, which are not connected to the trace lines TL1 and TL2 among the first and second sensing patterns SP1 and SP2, and floating pattern DMP may be connected to each other through floating contact holes OP2. The floating contact holes OP2 may overlap the floating pattern DMP.

The side lines TL-L and TL-R included in the second trace line TL2 and the second sensing patterns SP2 included in different second sensing electrodes TE2 from each other may be connected to each other through trace contact holes OP3. In the present embodiment, the trace contact holes OP3 may be disposed relatively closer to a center of the second sensing insulating layer TIL2 than other contact holes, e.g., the bridge contact and floating contact holes OP1 and OP2, are.

The first sensing patterns SP1 disposed adjacent to the sensing pads TDD among the first sensing patterns SP1 may be connected to the first trace line TL1 through connection contact holes OP4.

Referring to FIG. 8C, the second conductive layer TML2 may be disposed on the second sensing insulating layer TIL2. The second conductive layer TML2 may include the first sensing patterns SP1, the second sensing patterns SP2, and the second bridge patterns BP2.

The first sensing patterns SP1 may be spaced apart from the second sensing patterns SP2. For the convenience of explanation, the second sensing patterns SP2 and the second bridge patterns BP2 are shown as being separated from each other, however, the second sensing patterns SP2 and the second bridge patterns BP2 may be formed as a single pattern.

Referring to FIG. 8D, the third sensing insulating layer TIL3 may cover the second conductive layer TML2 and may be disposed above the second sensing insulating layer TIL2.

Figure 11A:
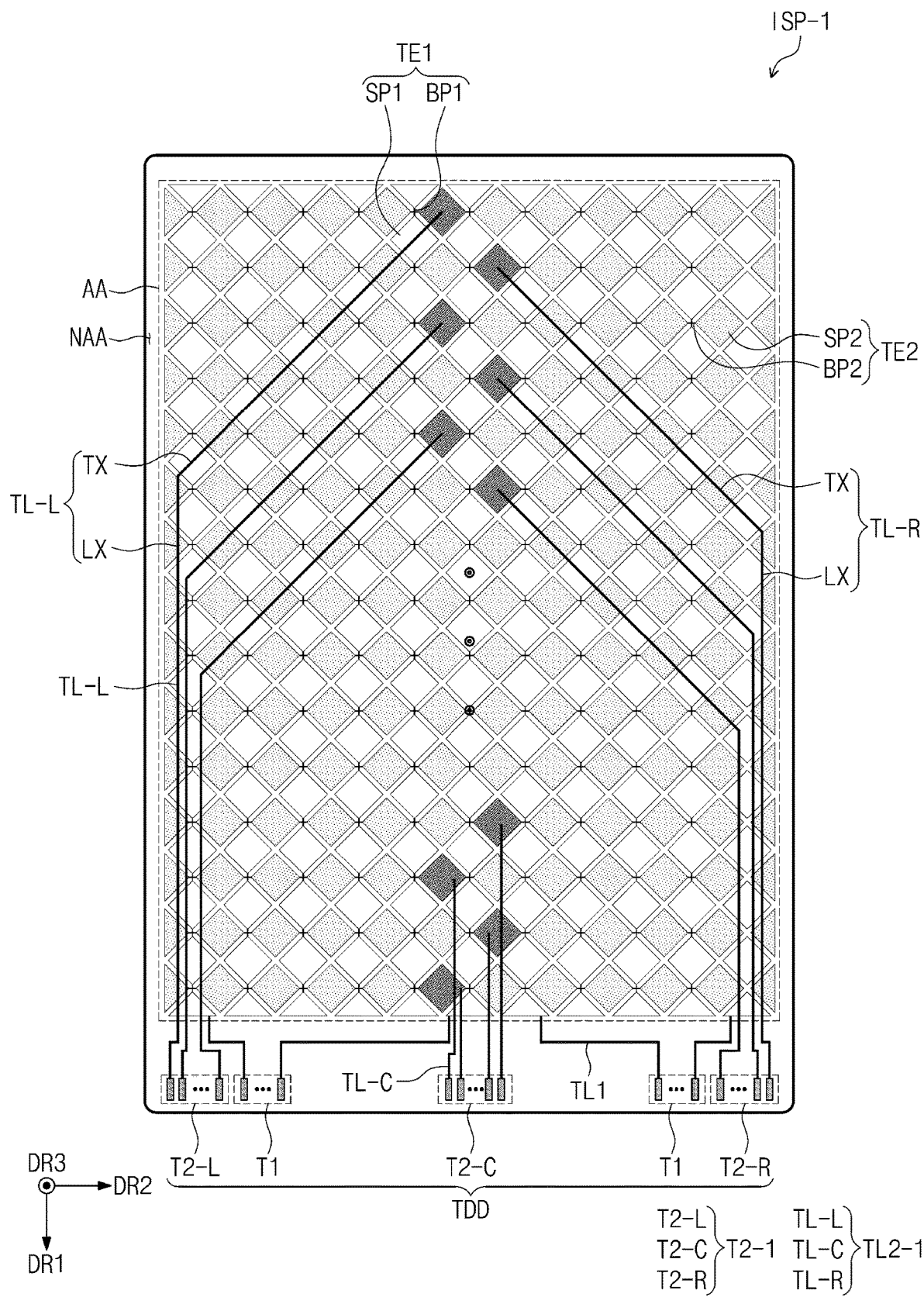
FIG. 11A is a plan view showing an input sensing panel according to an embodiment of the present disclosure.
Figure 11B:
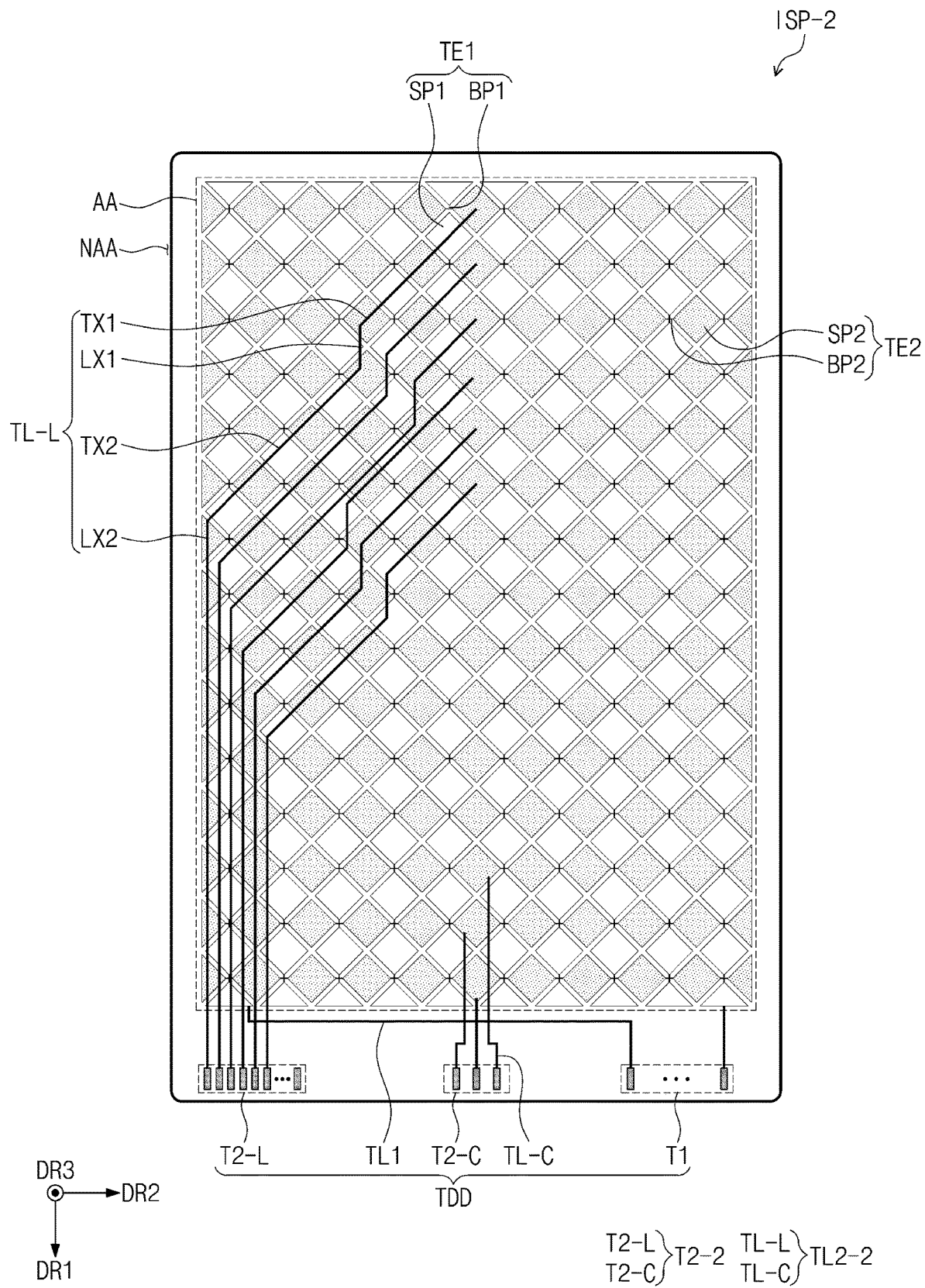
FIG. 11B is a plan view showing an input sensing panel according to an embodiment of the present disclosure.

FIG. 11A is a plan view showing an input sensing panel ISP-1 according to an embodiment of the present disclosure, and FIG. 11B is a plan view showing an input sensing panel ISP-2 according to an embodiment of the present disclosure. In FIGS. 11A and 11B, the same reference numerals denote the same elements in FIGS. 1 to 10, and thus, detailed descriptions of the same elements will be omitted.

Referring to FIG. 11A, the input sensing panel ISP-1 may include a first sensing electrode TE1, a second sensing electrode TE2, a first trace line TL1, a second trace line TL2-1, and sensing pads TDD.

The first sensing electrode TE1 may extend in the first direction DR1. The first sensing electrode TE1 may be provided in plural, and the first sensing electrodes TE1 may be arranged in the second direction DR2. The first sensing electrodes TE1 may include a plurality of first sensing patterns SP1 arranged in the first direction DR1 and first bridge patterns BP1 disposed between the first sensing patterns SP1 to connect adjacent first sensing patterns SP1 to each other.

The second sensing electrode TE2 may be insulated from the first sensing electrode TE1. The second sensing electrode TE2 may extend in the second direction DR2. The second sensing electrode TE2 may be provided in plural, and the second sensing electrodes TE2 may be arranged in the first direction DR1. The second sensing electrodes TE2 may include a plurality of second sensing patterns SP2 arranged in the second direction DR2 and second bridge patterns BP2 disposed between the second sensing patterns SP2. The second sensing patterns SP2 and the second bridge patterns BP2 may be provided as a single pattern.

The first trace line TL1 may be provided in plural and may be connected to a corresponding first sensing electrode TE1. The first trace line TL1 may be disposed in the peripheral area NAA and may not be viewed from the outside.

The second trace line TL2-1 may be provided in plural and may be connected to a corresponding second sensing electrode among the second sensing electrodes TE2. In the present disclosure, at least a portion of the second trace line TL2-1 may overlap the active area AA.

The second trace line TL2-1 may include side lines TL-L and TL-R and center lines TL-C. The side lines TL-L and TL-R may include first lines TL-L and second lines TL-R spaced apart from the first lines TL-L with the center lines TL-C interposed therebetween.

Each of the side lines TL-L and TL-R may include a diagonal portion TX and an extension portion LX. The diagonal portion TX may extend in a diagonal direction of the first direction DR1 and the second direction DR2, and the extension portion LX may extent in the first direction DR1 from the diagonal portion TX.

According to the present disclosure, at least a portion of the center lines TL-C and the side lines TL-L and TL-R may overlap the active area AA. The side lines TL-L and TL-R and the center lines TL-C may be connected to the second sensing patterns SP2 included in different second sensing electrodes TE2 from each other.

The extension portion LX may extend in the first direction DR1. The extension portion LX may overlap the first sensing patterns SP1 included in the same first sensing electrode TE1 among the first sensing patterns SP1. A first end of the extension portion LX may be connected to corresponding sensing pads T2-L and T2-R, a second end of extension portion LX, which faces the first end of the extension portion LX, may extend from the diagonal portion TX.

The diagonal portion TX may extend in a diagonal direction of the first direction DR1 and the second direction DR2. The diagonal portion TX may overlap the first sensing patterns SP1 included in different first sensing electrodes TE1 from each other among the first sensing patterns SP1. For example, the leftmost diagonal portion TX may overlap five difference first sensing patterns SP1. A first end of the diagonal portion TX may extend from the second end of the extension portion LX, and a second end of the diagonal portion TX, which faces the first end of the diagonal portion TX, may be connected to a corresponding second sensing pattern SP2. For example, the second end of the leftmost diagonal portion TX may be connected to a second sensing pattern SP2 offset from the center of the input sensing panel ISP-1.

In the input sensing panel ISP shown in FIG. 6A, the number of the second sensing patterns SP2 included in one second sensing electrode TE2 may be odd. Accordingly, the second sensing patterns SP2 connected to the second trace line TL2 described with reference to FIG. 6A may be aligned with each other when viewed in the first direction DR1.

In the input sensing panel ISP-1 according to the present embodiment, the number of the second sensing patterns SP2 included in one second sensing electrode TE2 may be even. Accordingly, the second sensing patterns SP2 connected to the second trace line TL2-1 may be disposed at or near the center of the input sensing panel ISP-1 and may be arranged in a zigzag shape along first direction DR1 when viewed in the first direction DR1. In other words, a first sensing pattern SP1 may be diagonally disposed between the second sensing patterns SP2 connected to the second trace line TL2-1.

Referring to FIG. 11B, a second trace line TL2-2 of the input sensing panel ISP-2 may include side lines TL-L and center lines TL-C. In the present embodiment, the side lines TL-L may be disposed at one side of the input sensing panel ISP-2 with respect to the center line TL-C. FIG. 11B shows the side lines TL-L disposed at a left side of the input sensing panel ISP-2 with respect to the center lines TL-C as a representative example, however, the present disclosure should not be limited thereto or thereby. According to another embodiment, the side lines TL-L may be disposed at a right side of the input sensing panel ISP-2 with respect to the center lines TL-C.

The side lines TL-L may include a plurality of diagonal portions TX1 and TX2 and a plurality of extension portions LX1 and LX2. The diagonal portions TX1 and TX2 may extend in a diagonal direction of the first direction DR1 and the second direction DR2, and the extension portions LX1 and LX2 may extend in the first direction DR1.

A first end of a first diagonal portion TX1 may be connected to a corresponding second sensing pattern SP2. The first diagonal portion TX1 may overlap first sensing patterns SP1 included in different first sensing electrodes TE1 from each other.

A first end of a first extension portion LX1 may extend from a second end of the first diagonal portion TX1.

A first end of a second diagonal portion TX2 may extend from a second end of the first extension portion LX1. The second diagonal portion TX2 may overlap the first sensing patterns SP1 included in different first sensing electrodes TE1 from each other.

A first end of the second extension portion LX2 may extend from a second end of the second diagonal portion TX2, and a second end of the second extension portion LX2 may be connected to a corresponding sensing pad T2-L.

In the present embodiment, each of the side lines TL-L includes two diagonal portions TX1 and TX2 and two extension portions LX1 and LX2, however, the number and shape of each of the diagonal portions TX1 and TX2 and the extension portions LX1 and LX2 should not be particularly limited.

Figure 12:
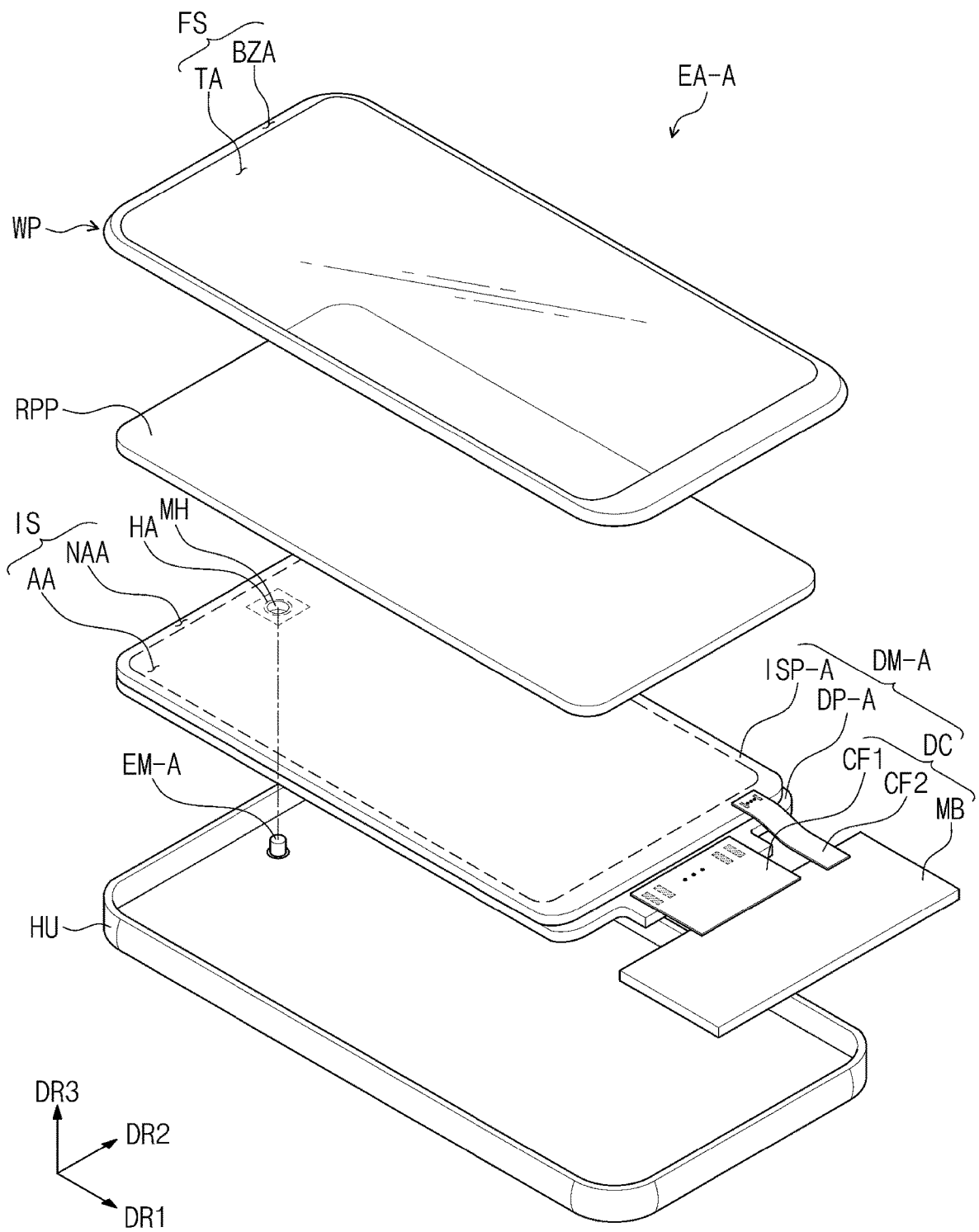
FIG. 12 is an exploded perspective view showing an electronic apparatus according to an embodiment of the present disclosure.
Figure 13A:
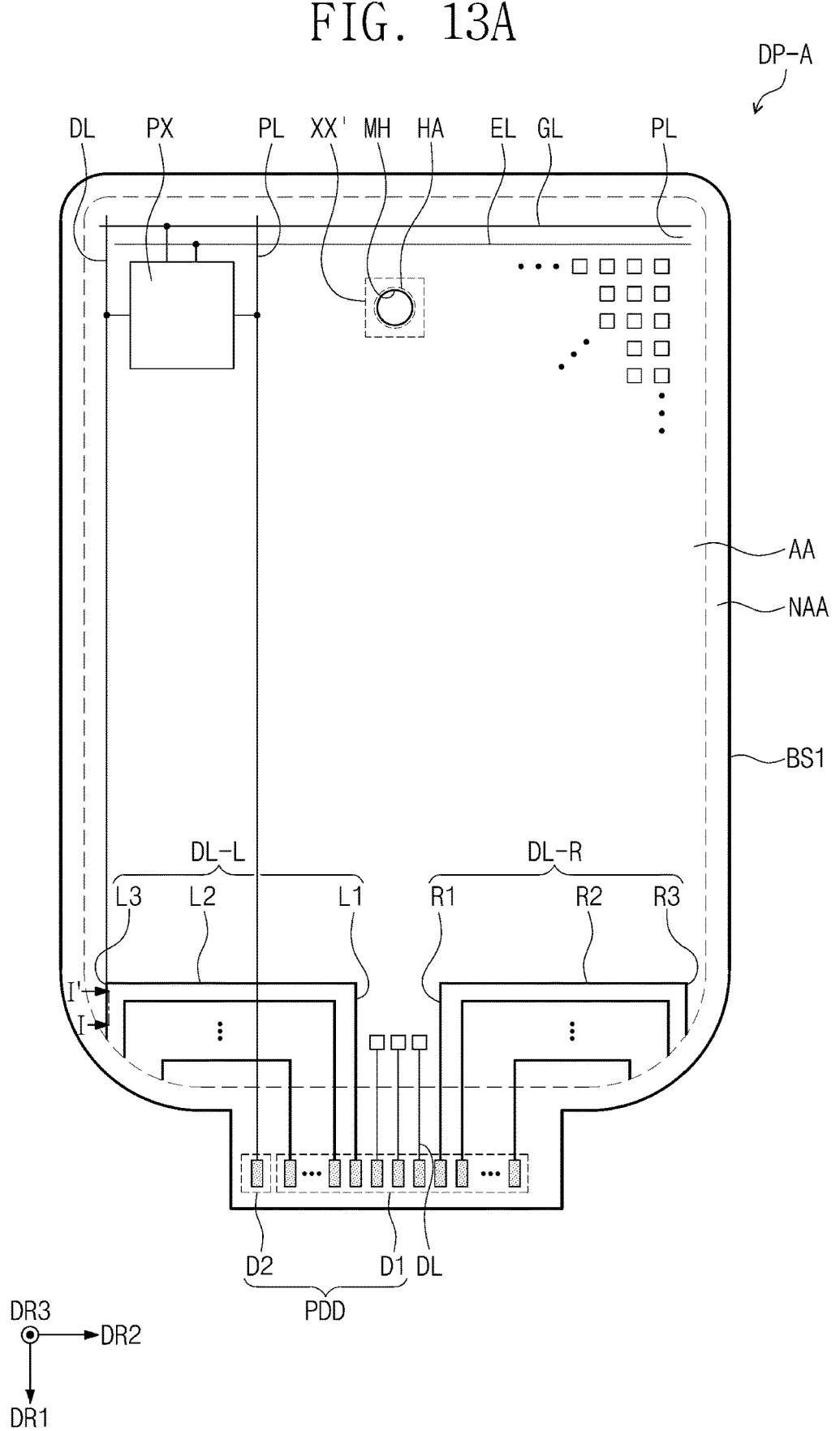
FIG. 13A is a plan view showing a display panel according to an embodiment of the present disclosure.
Figure 13B:
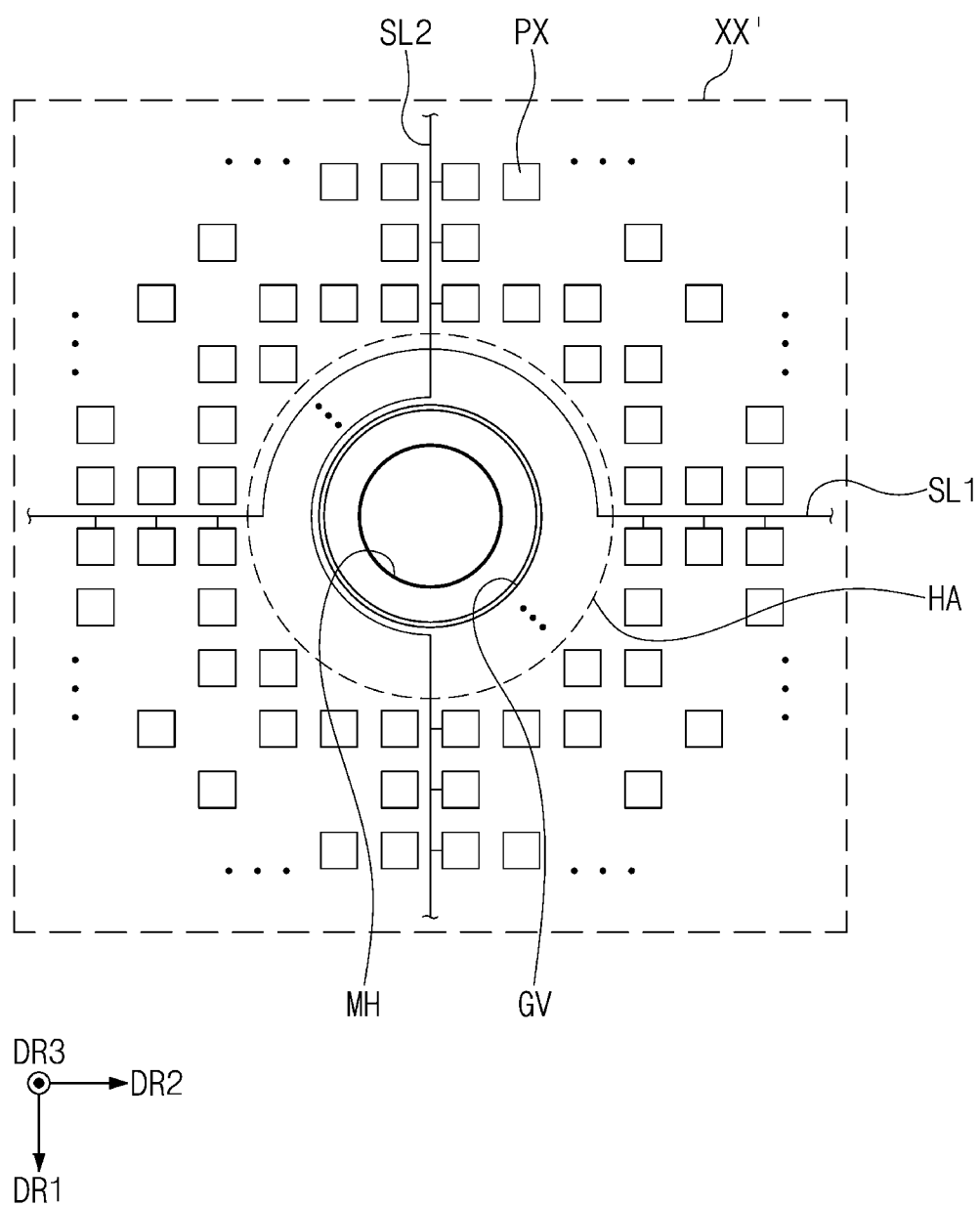
FIG. 13B is an enlarged view showing an area XX' shown in FIG. 13A.
Figure 14A:
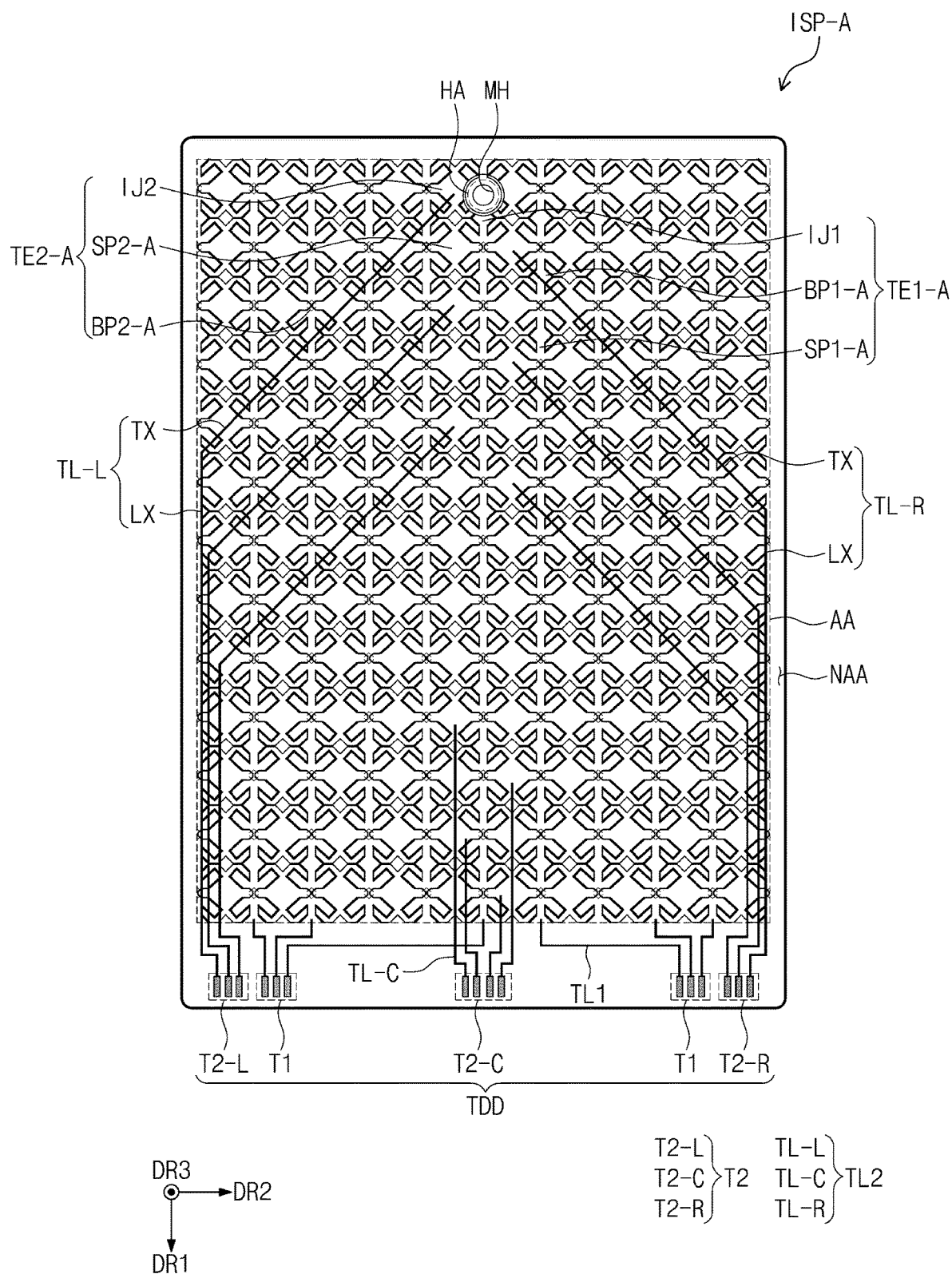
FIG. 14A is a plan view showing an input sensing panel according to an embodiment of the present disclosure.
Figure 14B:
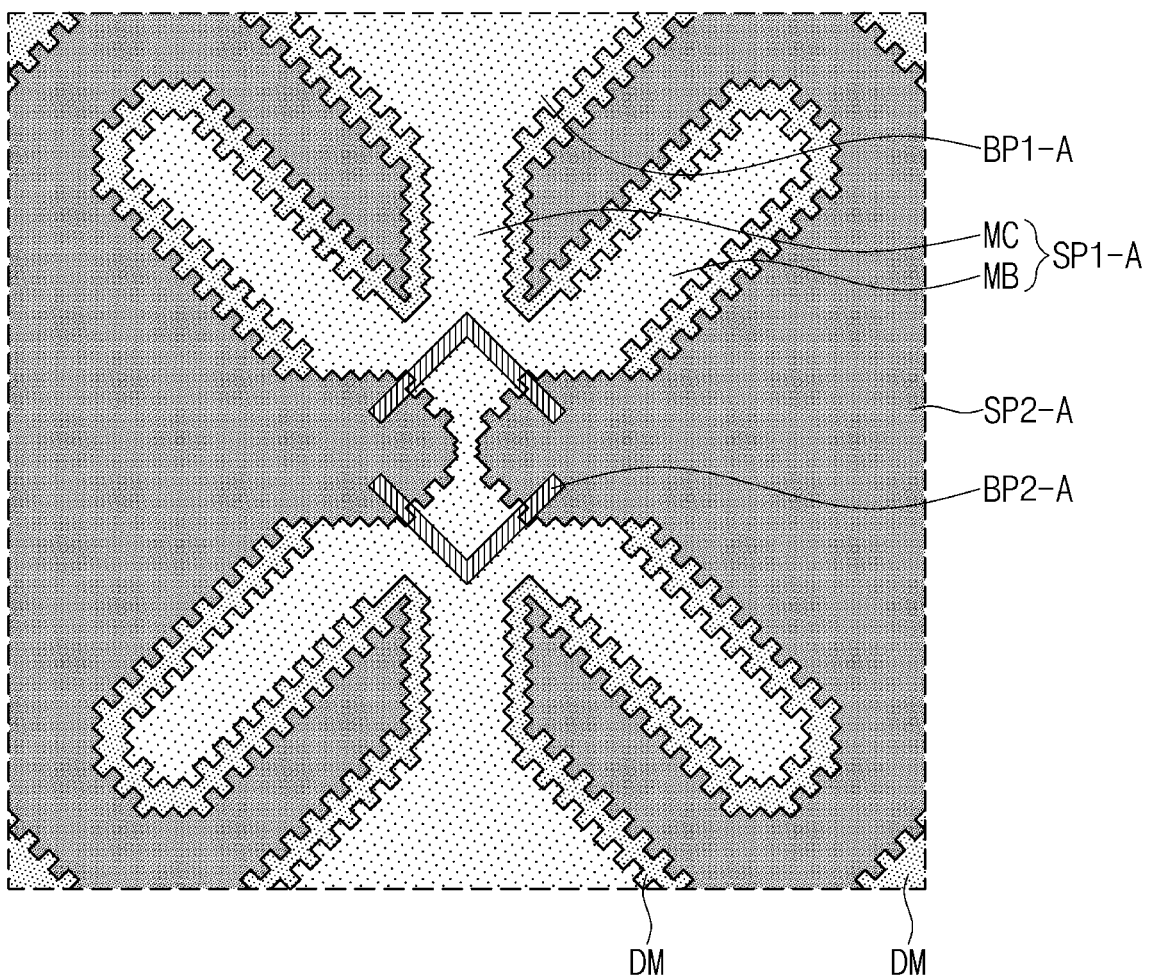
FIG. 14B is an enlarged plan view showing an area of an input sensing panel according to an embodiment of the present disclosure.

FIG. 12 is an exploded perspective view showing an electronic apparatus EA-A according to an embodiment of the present disclosure. FIG. 13A, is a plan view showing a display panel DP-A according to an embodiment of the present disclosure. FIG. 13B is an enlarged view showing an area XX' shown in FIG. 13A. FIG. 14A is a plan view showing an input sensing panel ISP-A according to an embodiment of the present disclosure. FIG. 14B is an enlarged plan view showing an area of the input sensing panel ISP-A according to an embodiment of the present disclosure.

Referring to FIG. 12, the electronic apparatus EA-A may include a window panel WP, an anti-reflective panel RPP, a display module DM-A, an electronic module EM-A, and a housing HU. The power supply module PM described with reference to FIG. 2A is omitted from FIG. 12.

The display module DM-A according to the present disclosure may be provided with a module hole MH. The module hole MH may overlap the electronic module EM-A. The electronic module EM-A may include at least one of the camera module CMM, the light emitting module LM, and the light receiving module LRM, which are described with reference to FIG. 2B.

Hereinafter, different features of the display panel DP-A shown in FIG. 13A from the display panel DP described with reference to FIG. 5A will be described.

The display panel DP-A according to the present embodiment may be provided with the module hole MH provided therethrough. The module hole MH may be formed in the active area AA. The module hole MH may overlap the electronic module EM-A that requires transmission and reception of the external light.

According to the present embodiment, since the module hole MH overlapping the electronic nodule EM-A overlaps the active area AA, a space in the peripheral area NAA required to dispose the electronic module EM-A may be reduced. Accordingly, the electronic apparatus EA-A may have improved aesthetics.

The pixels PX may be arranged around the module hole MH and may surround the module hole MH in a plane view. For the convenience of explanation, a hole area HA is indicated by a dotted line in FIG. 13A. The area XX' may include an area in which the module hole MH is provided. Hereinafter, the display panel DP-A in the area in which the module hole MH is provided will be described in detail with reference to FIG. 13B.

Referring to FIG. 13B, as described above, the module hole MH may be provided in the active area AA. Accordingly, at least some of the pixels PX may be disposed adjacent to the module hole MH. Some of the pixels PX may surround the module hole MH.

In addition, a predetermined groove pattern GV may be provided in the hole area HA. The groove pattern GV may be disposed along an edge of the module hole MH in a plane, and in the present embodiment, the groove pattern GV may have a circular ring shape surrounding the module hole MH. However, this is merely an example. For example, the groove pattern GV may have a shape different from that of the module hole MH, a polygonal shape, an oval shape, a closed line shape provided with at least a curved line, or a shape including a plurality of patterns that are partially disconnected, however, it should not be particularly limited.

The groove pattern GV may be formed by recessing a portion from the front surface of the display panel DP-A. For example, the groove pattern GV may be formed by removing at least one of the layers included in the circuit element layer ML-D of FIG. 5C and a portion of the base substrate BS. As the electronic apparatus EA-A according to the present disclosure includes the groove pattern GV surrounding the module hole MH, a path through which moisture and oxygen penetrating through the module hole MH flow into the pixel PX may be blocked. Accordingly, the electronic apparatus EA-A may have increased reliability.

A plurality of signal lines SL1 and SL2 connected to the pixels PX may be disposed in the hole area HA. The signal lines SL1 and SL2 may be connected to the pixels PX through the hole area HA. For the convenience of explanation, FIG. 13B shows a first signal line SL1 and a second signal line SL2 among the signal lines connected to the pixels PX as representative examples.

The first signal line SL1 may extend in the second direction DR2. Some pixels among the pixels PX connected to the first signal lines SL1 may be disposed at a left side with respect to the module hole MH, and the other pixels among the pixels PX may be disposed at a right side with respect e module hole MH. Accordingly, pixels arranged in the same row and connected to the first signal line SL1 may be turned on or turned off by substantially the same gate signal even though some pixels are omitted in an area corresponding to the module hole MH.

The second signal line SL2 may extend in the first direction DR1. The second signal line SL2 may be connected to pixels arranged in the same column along the first direction DR1 among the pixels PX. The second signal line SL2 will be described as corresponding to the data line DL.

Some pixels among the pixels connected to the second signal line SL2 may be arranged at an upper side with respect to the module hole MH, and the other pixels among the pixels connected to the second signal line SL2 may be disposed at a lower side with respect to the module hole MH. Therefore, the pixels arranged in the same column and connected to the second signal line SL2 may receive the data signal through the same data line even though some pixels are omitted in an area corresponding to the module hole MH.

The display panel DP-A according to the embodiment of the present disclosure may further include a connection pattern disposed in the hole area HA. In this case, the first signal line SL1 may be disconnected in an area overlapping the hole area HA. The disconnected portions of the first signal line SL1 may be connected to each other through the connection pattern. Similarly, the second signal line SL2 may be disconnected in the area overlapping the hole area HA, and a connection pattern that connects the disconnected portions of the second signal line SL2 to each other may be further provided.

Referring to FIGS. 14A and 14B, the input sensing panel ISP-A according to the present disclosure may include first sensing electrodes TE1-A second sensing electrodes TE2-A, a first trace line TL1, a second trace line TL2, and sensing pads TDD.

The first sensing electrodes TE1-A and the second sensing electrodes TE2-A may be disposed in the active area AA. The input sensing panel ISP-A may obtain information on the external input based on a variation in capacitance between the first sensing electrodes TE1-A and the second sensing electrodes TE2-A.

The first sensing electrodes TE1-A may extend in the first direction DR1 and may be arranged in the second direction DR2. The first sensing electrodes TE1-A may include a plurality of first sensing patterns SP1-A arranged in the first direction DR1 and first bridge patterns BP1-A disposed between the first sensing patterns SP1-A to connect the first sensing patterns SP1-A adjacent to each other.

In the present embodiment, the first sensing electrodes TE1-A may include first cut patterns IJ1 in which at least a portion thereof is cut when the module hole MH is formed. The first cut patterns IJ1 may be connected to each other via a line passing through the hole area HA and may receive substantially the same signal as patterns corresponding thereto. An area of one first cut pattern may be smaller than an area of one first sensing pattern.

In the present embodiment, for the convenience of explanation, the first bridge patterns BP1-A connecting the first sensing patterns SP1-A are described as a separate configuration, however, the first bridge patterns BP1-A and the first sensing patterns SP1-A may be provided as a single pattern.

Each of the first sensing patterns SP1-A may include a center pattern MC and branch patterns MB. The center pattern MC may extend in the first direction DR1. The branch patterns MB may extend in the direction DR4 and the fifth direction DR5 from the center pattern MC.

The first sensing electrodes TE1-A may be patterns included in the second conductive layer TML2 described with reference to FIG. 3B.

The second sensing electrodes TE2-A may be insulated from the first sensing electrodes TE1-A. The second sensing electrodes TE2-A may extend in the second direction DR2 and may be arranged in the first direction DR1. The second sensing electrodes TE2-A may include a plurality of second sensing patterns SP2-A arranged in the second direction DR2 and second bridge patterns BP2-A disposed between the second sensing patterns SP2-A to connect the second sensing patterns SP2-A adjacent to each other.

In the present embodiment, the second sensing electrodes TE2-A may include second cut patterns IJ2 in which at least a portion thereof is cut when the module hole MH is formed. The second cut patterns IJ2 may be connected to each other via a line passing through the hole area HA and may receive substantially the same signal as patterns corresponding thereto. An area of one second cut pattern IJ2 may be smaller than an area of one second sensing pattern SP2-A.

The second sensing patterns SP2-A and the second cut patterns IJ2 may be patterns included in the second conductive layer TML2 described with reference to FIG. 3B. The second bridge patterns BP2-A may be patterns included in the first conductive layer TML1 described with reference to FIG. 3B.

A dummy pattern DM may be disposed between the first sensing patterns SP1-A and the second sensing patterns SP2-A. The dummy pattern DM may be patterns electrically insulated from sensing patterns.

The first trace line TL1 may be provided in plural, and each of the first trace lines TL1 may be connected to a corresponding first sensing electrode TE1-A. The first trace line TL1 may be disposed in the peripheral area NAA and may not be viewed from the outside. The first trace lines overlapping the second trace line TL2 among the first trace lines TL1 may be disposed on different layers from each other, and thus, may be electrically insulated from each other.

The second trace line TL2 may be provided in plural, and each of the second trace lines TL2 may be connected to a corresponding second sensing electrode among the second sensing electrodes TE2-A. In the present embodiment, at least a portion of the second trace line TL2 may overlap the active area AA.

The second trace line TL2 may include side lines TL-L and TL-R and center lines TL-C. The side lines TL-L and TL-R may include first lines TL-L and second lines TL-R spaced apart from the first lines TL-L with the center lines TL-C interposed therebetween. For example, the first lines TL-L may be disposed at a left side of the input sensing panel ISP-A when compared with the second lines TL-R with respect to the center lines TL-C, and second lines TL-R may be disposed at a right side of the input sensing panel ISP-A when compared with the first lines TL-L with respect to the center lines TL-C.

Each of the side lines TL-L and TL-R may include a diagonal portion TX and an extension portion LX. The diagonal portion TX may extend in a diagonal direction of the first direction DR1 and the second direction DR2, and the extension portion LX may extent in the first direction DR1 from the diagonal portion TX.

According to the present disclosure, at least a portion of the center lines TL-C and the side lines TL-L and TL-R may overlap the active area AA. The side lines TL-L and TL-R and the center lines TL-C may be connected to the second sensing patterns SP2-A included in different second sensing electrodes TE2-A from each other.

The second sensing patterns SP2-A connected to the side lines TL-L and TL-R and the center lines TL-C may be the second sensing patterns SP2-A disposed at or near the center of the input sensing panel ISP-A. For example, the second bridge patterns BP2-A of the second sensing patterns SP2-A may be arranged at the center of the input sensing panel ISP-A.

The extension portion LX may extend in the first direction DR1. The extension portion LX may overlap the first sensing patterns SP1-A included in the same first sensing electrode TE1-A among the first sensing patterns SP1-A. A first end of the extension portion LX may be connected to corresponding sensing pads T2-L and T2-R, and a second end of the extension portion LX, which faces the first end of the extension portion LX, may extend from the diagonal portion TX.

The diagonal portion TX may extend in the diagonal direction of the first direction DR1 and the second direction DR2. The diagonal portion TX may overlap the first sensing patterns SP1-A included in different first sensing electrodes TE1-A from each other among the first sensing patterns SP1-A. A first end of the diagonal portion TX may extend from the second end of the extension portion LX, and a second end of the diagonal portion TX, which faces the first end of the diagonal portion TX, may be connected to a corresponding second sensing pattern SP2-A.

According to embodiments of the present disclosure described above, the trace lines connected to the sensing electrodes are disposed not to overlap the peripheral area, which surrounds the active area. However, the trace lines do overlap a portion of the peripheral area disposed at a lower portion of the display panel and the active area. Therefore, the peripheral area of the input sensing panel is reduced. Accordingly, a space required to arrange the trace lines in the peripheral area is reduced, and the electronic apparatus may have improved aesthetics.

Although embodiments of the present disclosure have been described, it is understood that the present disclosure should not be limited to these embodiments but various changes and modifications can be made thereto by one of ordinary skill in the art.

What is claimed is:
1. An electronic apparatus, comprising:
a display panel comprising an active area in which a plurality of pixels are disposed and a peripheral area adjacent to the active area;
an input sensing layer disposed on the display panel and the input sensing layer comprising:
an intermediate sensing insulating layer in which a plurality of contact holes are defined;
a plurality of first sensing electrodes each extending in a first direction and each comprising a plurality of first sensing patterns comprising a plurality of mesh lines;
a plurality of second sensing electrodes each extending in a second direction crossing the first direction and comprising a plurality of mesh lines;
a plurality of first trace lines connected to each of the plurality of first sensing electrodes; and
a plurality of second trace lines connected to each of the plurality of second sensing electrodes,
wherein at least one of the plurality of second trace lines comprises:
a diagonal portion extending in a diagonal direction with respect to the first or second directions and an extension portion extending toward the peripheral area from the diagonal portion, wherein the diagonal portion overlaps a plurality of different first sensing electrodes.

2. An electronic apparatus, comprising:
a display panel comprising an active area in which a plurality of pixels are disposed and a peripheral area adjacent to the active area;
an input sensing layer disposed on the display panel and the input sensing layer comprising:
an intermediate sensing insulating layer in which a plurality of contact holes are defined;
a plurality of first sensing electrodes each extending in a first direction and each comprising a plurality of first sensing patterns comprising a plurality of mesh lines;
a plurality of second sensing electrodes each extending in a second direction crossing the first direction and comprising a plurality of mesh lines;
a plurality of first trace lines connected to each of the plurality of first sensing electrodes; and
a plurality of second trace lines connected to each of the plurality of second sensing electrodes,
wherein at least one of the plurality of second trace lines comprises:
a diagonal portion extending in a diagonal direction with respect to the first or second directions and an extension portion extending toward the peripheral area from the diagonal portion,
wherein the extension portion is disposed adjacent to a boundary between the active area and the peripheral area, and
one end of the diagonal portion connected to the second sensing electrode is disposed in the center of the active area compared to the other end of the diagonal portion connected to the extension portion.

3. An electronic apparatus, comprising:
a display panel comprising an active area in which a plurality of pixels are disposed and a peripheral area adjacent to the active area;
an input sensing layer disposed on the display panel and the input sensing layer comprising:
an intermediate sensing insulating layer in which a plurality of contact holes are defined;
a plurality of first sensing electrodes each extending in a first direction and each comprising a plurality of first sensing patterns comprising a plurality of mesh lines;
a plurality of second sensing electrodes each extending in a second direction crossing the first direction and comprising a plurality of mesh lines;
a plurality of first trace lines connected to each of the plurality of first sensing electrodes; and
a plurality of second trace lines connected to each of the plurality of second sensing electrodes,
wherein at least one of the plurality of second trace lines comprises:
a diagonal portion extending in a diagonal direction with respect to the first or second directions and an extension portion extending toward the peripheral area from the diagonal portion,
wherein the diagonal portion further comprises:
a first sub diagonal portion connected to the second sensing electrode; and
a second sub diagonal portion connected to the extension portion and spaced apart from the first sub diagonal portion; and
a sub connection portion extending in the first direction and disposed between the first sub diagonal portion and the second sub diagonal portion.

4. The electronic apparatus of claim 1, further comprising:
a lower sensing insulating layer disposed under the intermediate sensing insulating layer,
wherein each of the plurality of second sensing electrodes comprises a plurality of second sensing patterns arranged in the second direction and a plurality of connection patterns arranged between the adjacent second sensing patterns,
each of the plurality of first sensing electrodes comprises a plurality of bridge patterns is disposed on the lower sensing insulating layer and connected to an adjacent first sensing pattern among the plurality of first sensing patterns through a corresponding one of the contact holes, and
the plurality of first sensing patterns, the plurality of second sensing patterns, and the plurality of connection patterns are disposed on the intermediate sensing insulating layer, and the plurality of bridge patterns is disposed on the lower sensing insulating layer.

5. The electronic apparatus of claim 4, wherein the diagonal portion is connected to a second sensing pattern disposed at the center of the second sensing patterns.

6. The electronic apparatus of claim 5, further comprising a floating pattern disposed on the lower sensing insulating layer and connected to at least one of the plurality of first sensing patterns and the plurality of second sensing patterns through a corresponding one of the contact holes.

7. The electronic apparatus of claim 5, wherein the diagonal portion and the extension portion are disposed on the lower sensing insulating layer, and the diagonal portion is connected to the second sensing pattern through a corresponding one of the contact holes.

8. The electronic apparatus of claim 1, wherein the diagonal portion overlaps the plurality of first sensing patterns of the different first sensing electrodes and the extension portion overlaps the plurality of first sensing patterns of the same first sensing electrode.

9. The electronic apparatus of claim 1, wherein the display panel comprises a plurality of data lines connected to each of the pixels and pads connected to each of the plurality of data lines and overlapping the peripheral area;
wherein at least one of the data lines which comprises:
a first line having one end connected to a corresponding pad among the pads, extending in the first direction, and having the other end overlapping an active area;
a second line extending in the second direction and having one end connected to the other end of the first line; and
a third line extending in the first direction and having one end connected to the other end of the second line and the other end connected to a corresponding pixel among the pixels.

10. The electronic apparatus of claim 1, wherein each of the plurality of first sensing patterns comprises a central pattern extending in the first direction and a plurality of branch patterns extending in different directions from the central pattern, and
each of the plurality of second sensing electrodes comprises a plurality of second sensing patterns surrounding the branch patterns and at least one bridge pattern disposed between the second sensing patterns spaced apart from each other with the center pattern interposed therebetween.

11. The electronic apparatus of claim 1, wherein the display panel comprises:
a base substrate;
a circuit element layer disposed on the base substrate and comprising a transistor;
a display element layer comprising a pixel definition layer disposed on the circuit element layer and provided with a display opening, a first electrode exposed through the display opening and connected to the transistor, a second electrode disposed on the first electrode, and a light emitting layer disposed between the first electrode and the second electrode; and
a thin film encapsulation layer covering the display element layer, and
wherein a plurality of mesh lines overlaps the pixel definition layer.

12. The electronic apparatus of claim 11, wherein the input sensing layer is disposed directly on the thin film encapsulation layer.

13. The electronic apparatus of claim 1, further comprising an electronic module overlapping the active area and disposed under the display panel.

14. The electronic apparatus of claim 13, wherein the display panel and the input sensing layer are provided with a module hole in the display panel and the input sensing layer, and the module hole overlaps the electronic module.

15. The electronic apparatus of claim 14, wherein the electronic module comprises a camera module, a light receiving module, or a light emitting module.

* * * * *